(12) United States Patent
Puranik et al.

(10) Patent No.: US 9,730,157 B2
(45) Date of Patent: Aug. 8, 2017

(54) WIRELESS LOCAL AREA NETWORK ASSISTED NETWORK DETECTION FOR USER EQUIPMENT

(71) Applicant: QUALCOMM Incorporated, San Diego, CA (US)

(72) Inventors: Anand Krishna Puranik, Hyderabad (IN); Debesh Kumar Sahu, Hyderabad (IN); George Cherian, San Diego, CA (US); Tushar Gupta, Hyderabad (IN); Nishi Kanta Das, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 79 days.

(21) Appl. No.: 14/270,078

(22) Filed: May 5, 2014

(65) Prior Publication Data

US 2015/0131462 A1   May 14, 2015

Related U.S. Application Data

(60) Provisional application No. 61/901,813, filed on Nov. 8, 2013.

(51) Int. Cl.
*H04W 52/02* (2009.01)
*H04W 48/16* (2009.01)

(52) U.S. Cl.
CPC ... *H04W 52/0212* (2013.01); *H04W 52/0216* (2013.01); *H04W 52/0229* (2013.01); *H04W 48/16* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 7,551,576 B2* | 6/2009 | Ahmavaara | ........... | H04M 15/00 370/328 |
| 8,185,103 B2* | 5/2012 | Alfano | ................ | H04W 48/04 455/414.2 |
| 8,374,158 B2* | 2/2013 | Dostal | .................. | H04W 48/10 370/328 |
| 8,619,729 B2* | 12/2013 | Alper | ................ | H04L 29/12113 370/254 |
| 9,237,503 B2* | 1/2016 | Shaheen | ............... | H04W 36/24 |
| 2005/0003794 A1* | 1/2005 | Liu | .................. | H04W 52/0216 455/355 |
| 2005/0233789 A1 | 10/2005 | Maekawa | | |

(Continued)

*Primary Examiner* — Andrew Lai
*Assistant Examiner* — Jamaal Henson
(74) *Attorney, Agent, or Firm* — Holland & Hart LLP

(57) ABSTRACT

Methods, systems, and devices are described for detecting a communications network or assisting in the detection of a communications network. In a method for detecting a communications network, a beacon received from a device over a wireless local area network (WLAN) may be decoded to identify an information element (IE) in the beacon. The IE may indicate an availability of another network. When the IE is empty, a sleep mode may be entered (e.g., by a user equipment (UE)). In a method for assisting a detection of a communications network, a database including information indicating an availability of at least a first network may be accessed, and a beacon may be broadcast over a WLAN. The beacon may include an IE that indicates the availability of at least the first network.

25 Claims, 18 Drawing Sheets

(56) References Cited

U.S. PATENT DOCUMENTS

| | | | | |
|---|---|---|---|---|
| 2006/0221919 A1* | 10/2006 | McRae | ............... | H04W 48/16 370/338 |
| 2007/0086378 A1* | 4/2007 | Matta | ............... | H04W 24/10 370/329 |
| 2007/0211675 A1* | 9/2007 | Jain | ............... | H04W 88/06 370/338 |
| 2008/0181156 A1 | 7/2008 | Ecclesine | | |
| 2008/0247376 A1 | 10/2008 | Del et al. | | |
| 2009/0005127 A1* | 1/2009 | Frenger | ............... | H04W 52/28 455/574 |
| 2009/0245206 A1* | 10/2009 | Liu | ............... | H04W 36/0055 370/331 |
| 2010/0034319 A1* | 2/2010 | Ludvigsen | ............... | H04L 1/0071 375/340 |
| 2011/0201372 A1* | 8/2011 | Luo | ............... | H04W 16/14 455/509 |
| 2011/0216692 A1* | 9/2011 | Lundsgaard | ............... | H04W 48/20 370/328 |
| 2012/0178448 A1* | 7/2012 | Yuk | ............... | H04W 88/06 455/435.1 |
| 2013/0077545 A1 | 3/2013 | Chin et al. | | |
| 2013/0148642 A1 | 6/2013 | Abraham et al. | | |
| 2013/0177007 A1 | 7/2013 | Lee et al. | | |
| 2013/0189939 A1* | 7/2013 | Wang | ............... | G06Q 30/02 455/127.1 |
| 2013/0232555 A1 | 9/2013 | Zhang et al. | | |
| 2013/0252608 A1* | 9/2013 | Lee | ............... | H04W 88/06 455/434 |
| 2013/0308618 A1* | 11/2013 | Panneerselvam | ............... | G01S 5/0236 370/338 |
| 2014/0003404 A1 | 1/2014 | Gillett et al. | | |
| 2014/0029570 A1* | 1/2014 | Lee | ............... | H04W 36/0005 370/331 |
| 2014/0235237 A1* | 8/2014 | Shin | ............... | H04W 48/16 455/434 |
| 2015/0049630 A1* | 2/2015 | Kritt | ............... | H04W 48/18 370/254 |
| 2016/0081130 A1* | 3/2016 | Wang | ............... | H04W 12/06 370/254 |

* cited by examiner

WIRELESS LOCAL AREA NETWORK ASSISTED NETWORK DETECTION FOR USER EQUIPMENT

CROSS REFERENCES

The present application for patent claims priority to U.S. Provisional Patent Application No. 61/901,813 by Puranik et al., entitled "WLAN Assisted Network Detection for User Equipment," filed Nov. 8, 2013, assigned to the assignee hereof.

BACKGROUND

The following relates generally to wireless communication, and more specifically to detecting the availability of a communications network following a loss of coverage event. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple user equipments (UEs, such as mobile devices). Base stations may communicate with mobile devices on downstream and upstream links. Each base station has a coverage range, which may be referred to as the coverage area of the cell. When a UE moves outside the coverage area of all base stations associated with a communications network, the UE may "lose coverage," with a resultant loss of services provided by the communications network. Upon losing coverage, the UE may initiate a number of searches or scans for the communications network, so that the UE may reconnect with the communications network when it once again becomes available (e.g., by virtue of the UE moving back within the coverage area of one of the communication network's base stations).

SUMMARY

The described features generally relate to one or more methods, systems, and/or devices for detecting a communications network or assisting in the detection of a communications network. More particularly, a wireless local area network (WLAN) access point may determine the availability of at least one communications network in its vicinity (e.g., that overlaps its coverage area) and broadcast this information in an information element of its beacon. An empty information element (IE) may be used to indicate that a communications network, other than a WLAN, is not available. A UE that loses coverage of the communications network, other than the WLAN, but which receives beacons from at least one access point of the WLAN, may ascertain from the beacons whether there is a good probability that the UE has returned to the coverage area of the other communications network (e.g., based on the presumption that it is more likely that a UE is within the coverage area of the communications network if a nearby WLAN access point is also within the coverage area of the communications network; and it is less likely that the UE is within the coverage area of the communications network if a nearby WLAN access point is not within the coverage area of the communications network). In the absence of the disclosed methods, systems, and/or devices, a UE may consume more power as it repeatedly scans or searches for a communications network.

In some embodiments, a method for detecting a communications network includes identifying an information element (IE) in a beacon received from a device over a wireless communication network, the IE may indicate an availability of another network, and entering a sleep mode when the IE is empty.

In some embodiments, a device for detecting a communications network includes means for identifying an information element (IE) in a beacon received from a device over a wireless communication network, the IE may indicate an availability of another network, and means for entering a sleep mode when the IE is empty.

In some embodiments, a method for assisting a detection of a communications network includes accessing a database including information indicating an availability of at least a first network, and broadcasting a beacon over a wireless communication network, the beacon may include an information element (IE) that indicates the availability of at least the first network.

Various embodiments of the methods and/or device may include the features of and/or means for entering an active mode when the IE includes data. Identifying the IE in the beacon may include decoding the beacon to identify the IE in the beacon.

Various embodiments of the methods and/or device may include the features of and/or means for determining a signal strength of the beacon when the IE includes data, and classifying the data in the IE as being reliable based at least in part on the determined signal strength. The data in the IE may include at least one of band, channel, and public local mobile network (PLMN) identification information for the other network.

Various embodiments of the methods and/or device may include the features of and/or means for interrupting a protocol stack to request to latch to a band, channel, or PLMN identified by the band, channel, or PLMN identification information in the IE.

Various embodiments of the methods and/or device may include the features of and/or means for connecting to the other network using the data in the IE when the data is classified as being reliable.

Various embodiments of the methods and/or device may include the features of and/or means for identifying an IE in a subsequent beacon received from the device over the wireless communication network, and transitioning from the sleep mode to an active mode when the IE in the subsequent beacon includes data.

Various embodiments of the methods and/or device may include the features of and/or means for determining whether the other network is out of service, and identifying an IE in the beacon when the other network is determined to be out of service.

Various embodiments of the methods and/or device may include the features of and/or means for receiving a beacon from a plurality of devices over the wireless communication network, and identifying an IE in at least one of the beacons received from the plurality of devices, the IE may indicate an availability of at least one other network that is different from the wireless communication network.

Various embodiments of the methods and/or device may include the features of and/or means for identifying a plurality of beacons that comprise an IE that includes data indicating that one or more of the at least one other network is available, comparing a signal strength of each of the one or more beacons that include an IE that includes data, to identify a beacon with a greatest signal strength, and using the data in the IE of the beacon with the greatest signal strength to connect to one of the other networks identified by the data in the IE. In some examples, data included in the IE includes at least one of band, channel, and public land mobile network (PLMN) identification information for ate least one PLMN.

Various embodiments of the methods and/or device may include the features of and/or means for determining whether the beacon is received from an access point classified as a near access point based at least in part on at least one of a signal strength received from the access point, a number of mobile stations connected to the access point, and whether the access point is identified as a preferred access point.

Various embodiments of the methods and/or device may include the features of and/or means for bypassing at least one of a High-Priority PLMN search and a better system reselection (BSR) scan when the beacon is received from the access point classified as a near access point.

Various embodiments of the methods and/or device may include the features of and/or means for establishing a connection over the wireless communication network with at least one user equipment (UE), receiving, from the at least one UE, information indicating the availability of at least the first network, and populating the database with the information received from the at least one UE.

Various embodiments of the methods and/or device may include the features of and/or means for establishing a connection over the wireless communication network with at least one user equipment (UE), periodically polling the at least one UE for information indicating the availability of at least the first network, receiving from the at least one UE, the information indicating the availability of at least the first network, and populating the database with the information received from the at least one UE.

Various embodiments of the methods and/or device may include the features of and/or means for periodically monitoring at least the first network using a modem, and populating the database with information indicating the availability of at least the first network based at least in part on the periodic monitoring.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
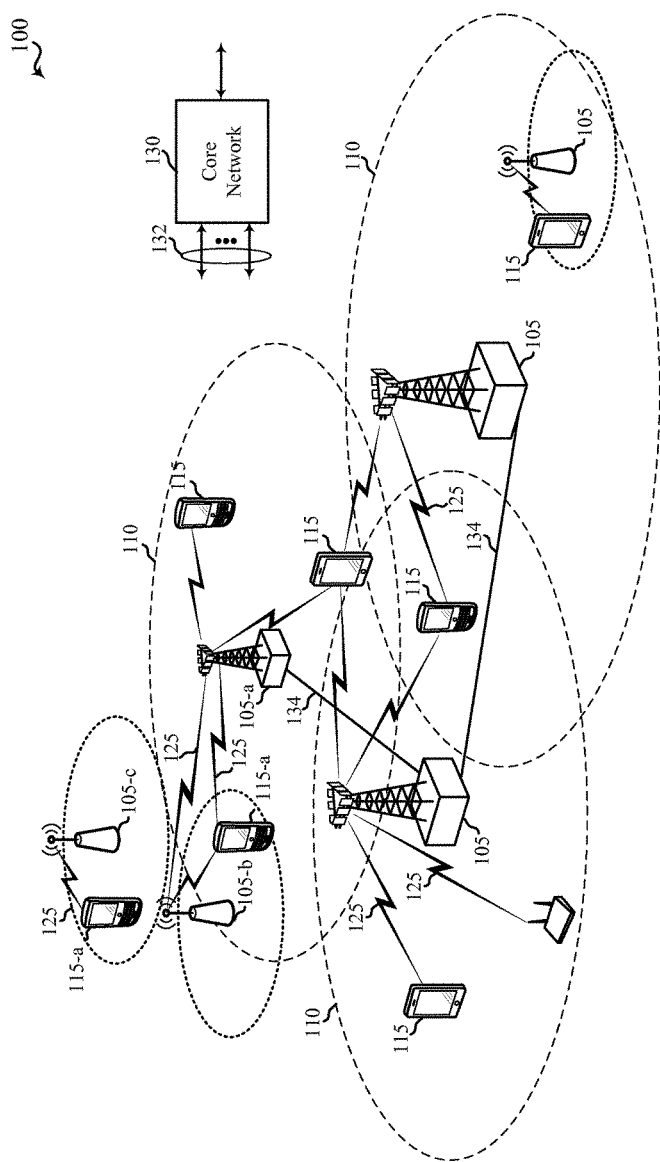
FIG. 1 shows a block diagram of a wireless communications system.

The detection of a communications network following a loss of coverage event is described. Consider, for example, a multi-story shopping mall having a basement, in which cellular coverage is available on the main floors of the mall, but only Wi-Fi coverage (e.g., a WLAN) is available in the basement. When a UE (e.g., a mobile device such as a smart phone) is moved from one of the main floors of the mall to the basement, it may lose cellular coverage and go Out of Service (OOS). In some cases, the UE may be programmed to scan for a cellular channel for a certain amount of time (e.g., fifteen minutes), and then alternate between three minute sleep intervals and additional scanning intervals. Unfortunately, the UE may consume significant power during the scans, despite there being no chance of obtaining cellular coverage while the UE remains in the basement. In addition, the UE may return to one of the main floors of the mall shortly after the UE enters one of its three minute sleep intervals, meaning the UE may not obtain cellular coverage for three or more minutes after cellular coverage becomes available.

As another example, consider a UE user that boards an airplane. While on the airplane, the user may place his or her UE in a flight mode. When the user lands, the user may switch his or her UE back to an online mode. At this point, the UE may start both WLAN and wireless wide area network (WWAN) (e.g., Long Term Evolution (LTE)/Wideband CDMA (WCDMA)/Global System for Mobile Communications (GSM)/CDMA) scanning. However, because the UE is in a completely new geographical service area when the user switches the UE to online mode, the UE may start scanning channels present in a recently acquired system database. However, this is not of any use given that this database does not contain the public land mobile network identifier (PLMN ID)/channels of the new service area. Ultimately, the UE may scan all supported bands for each radio access technology (RAT), to start building a database of available channels and their PLMN IDs. From the list of PLMN IDs, the UE may decide which band and channel to use, based on the priority of the PLMNs for each RAT. For example, a 3rd Generation Partnership Project (3GPP) UE may take one to three minutes to identify available PLMN IDs for GWL (GSM, WCDMA, time division LTE (TD LTE)) RATs.

If WLAN access points were to determine the availability of communications networks (e.g., cellular networks) in their vicinity, and broadcast this information to UEs, the UEs may be able to determine the availability of a communications network much quicker than through cellular service scans. Furthermore, a UE outside the coverage area of a cellular network may use the information on the availability of at least one communications network, received from WLAN access points, to determine whether it may be useful to transition from a long sleep mode to an active mode to scan for network coverage. In the methods, systems, and devices described herein, WLAN access points may include information on the availability of at least one communications network in IEs included in their beacons (e.g., in Institute of Electrical and Electronics Engineers (IEEE) Standards (Std.) 802.11 beacons).

Thus, the following description provides examples, and does not limit the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a block diagram of a wireless communications system 100, in accordance with various aspects of the present disclosure. The wireless communications system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via at least one access point antenna. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for an access point may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the wireless communications system 100 may include an LTE/LTE-Advanced (LTE-A) communications system (or network), which LTE/LTE-A communications system may support one or more LTE-A in unlicensed spectrum (LTE-U) modes of operation or deployment scenarios. In other embodiments, the wireless communications system 100 may support wireless communication using an unlicensed spectrum and an access technology different from LTE-U, or a licensed spectrum and an access technology different from LTE/LTE-A. In LTE/LTE-A communications systems, the term evolved NodeB or eNB may be generally used to describe the access points 105. The wireless communications system 100 may be a Heterogeneous LTE/LTE-A/LTE-U network in which different types of eNBs provide coverage for various geographical regions. For example, each eNB 105 may provide communication coverage for a macro cell, a pico cell, a femto cell, and/or other types of cells. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., 51 application protocol, etc.). The eNBs 105 may also communicate with one another, e.g., directly or indirectly via backhaul links 134 (e.g., X2 application protocol, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum (e.g., LTE-U), or both (LTE/LTE-U). Similarly, the uplink transmissions may be made using a licensed spectrum (e.g., LTE), an unlicensed spectrum (e.g., LTE-U), or both (LTE/LTE-U).

In some embodiments of the wireless communications system 100, various deployment scenarios for LTE-U may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while single-carrier FDMA (SC-FDMA) communications signals may be used in the communications links 125 for LTE uplink transmissions in an unlicensed and/or a licensed spectrum.

By way of example, FIG. 1 illustrates a UE 115-a moved between two positions. When the UE 115-a is in a first position, it is within the coverage area 110 of a cellular network and receives cellular coverage from a base station 105-a. The UE 115-a may also be in the coverage area of a WLAN access point 105-b. When the UE 115-a is moved from the first position to a second position, the UE 115-a may lose cellular coverage from the base station 105-a. However, the UE 115-a may receive WLAN coverage from a WLAN access point 105-c when in the second position. Because the WLAN access point 105-c is not within a cellular coverage area 110, the WLAN access point 105-c may include an empty IE in its beacon, thereby enabling the UE 115-a to determine that no cellular coverage is available and enter a sleep mode of indefinite duration. When the UE 115-a is moved from the second position back to the first position, the UE 115-a may remain in its sleep mode until it begins to receive beacons from the WLAN access point 105-b. Because the WLAN access point 105-b is within a cellular coverage area 110, the WLAN access point 105-b may include, in an IE of its beacon, data indicating that a cellular network is available. At this point, the UE 115-a may transition to an active mode and initiate a scan for the cellular network identified in the beacon of the WLAN access point 105-b.

Figure 2A:
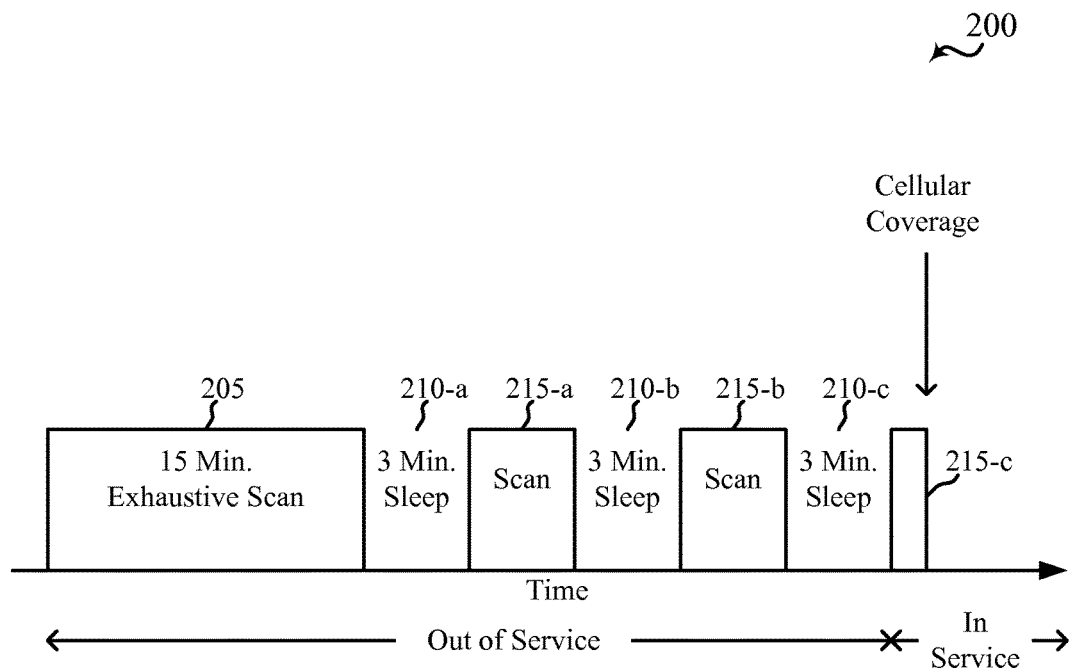
FIG. 2A is a timing diagram illustrating how a UE that has lost cellular coverage may cycle through sleep periods and active periods as it scans for a cellular network.

FIG. 2A is a timing diagram 200 illustrating how a UE that has lost cellular coverage may cycle through sleep periods and active periods as it scans for a cellular network. The UE may be an example of one or more aspects of one of the UEs 115 described with reference to FIG. 1. Upon losing coverage, the UE may begin a fifteen minute exhaustive scan 205. Upon not finding a cellular network, the UE may enter a sleep mode 210-a, in which it sleeps for three minutes before transitioning back to an active scan mode 215-a and scanning again for cellular coverage. The UE may repeat this cycle many times, switching between sleep mode 210-a, 210-b, 210-c and active scan mode 215-a, 215-b, 215-c. Upon detecting cellular coverage during the active scan mode 215-c, the UE may transition from a cellular OOS mode to a cellular In Service mode.

Figure 2B:
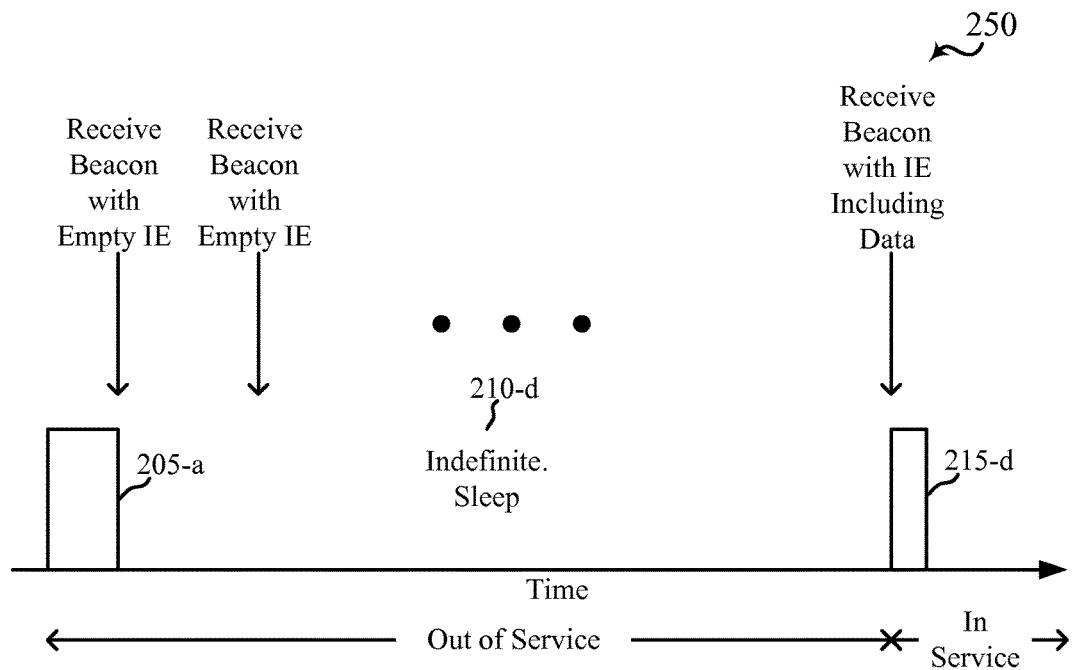
FIG. 2B is a timing diagram illustrating how a UE that has lost cellular coverage may enter and remain in a sleep mode until it receives a beacon over a WLAN, which beacon includes an IE that indicates a cellular network may be available, in accordance with various aspects of the present disclosure.

FIG. 2B is a timing diagram 250 illustrating how a UE that has lost cellular coverage may enter and remain in a sleep mode until it receives a beacon over a WLAN, which beacon includes an IE that indicates a cellular network may be available, in accordance with various aspects of the present disclosure. The UE may be an example of one or more aspects of one of the UEs 115 described with reference to FIG. 1. Upon losing coverage, the UE may begin a fifteen minute exhaustive scan 205-a, as described in FIG. 2A. However, because the UE receives a beacon from a WLAN access point, which beacon includes an empty IE indicative that no cellular coverage is available, the UE may terminate its exhaustive scan 205-a prematurely and enter a sleep mode 210-d of indefinite duration. The UE may remain in its sleep mode 210-d until such time that it receives a beacon with an IE that includes data identifying an available cellular network. At this point, the UE may transition from the sleep mode 210-d to an active scan mode 215-d, scan for the cellular network, and transition from a cellular OOS mode to a cellular In Service mode. The UE operating in accord with the timing diagram shown in FIG. 2B may therefore conserve power over the UE operating in accord with the timing diagram shown in FIG. 2A, by entering a potentially longer sleep mode 210-d and bypassing certain network scanning events.

Figure 3:
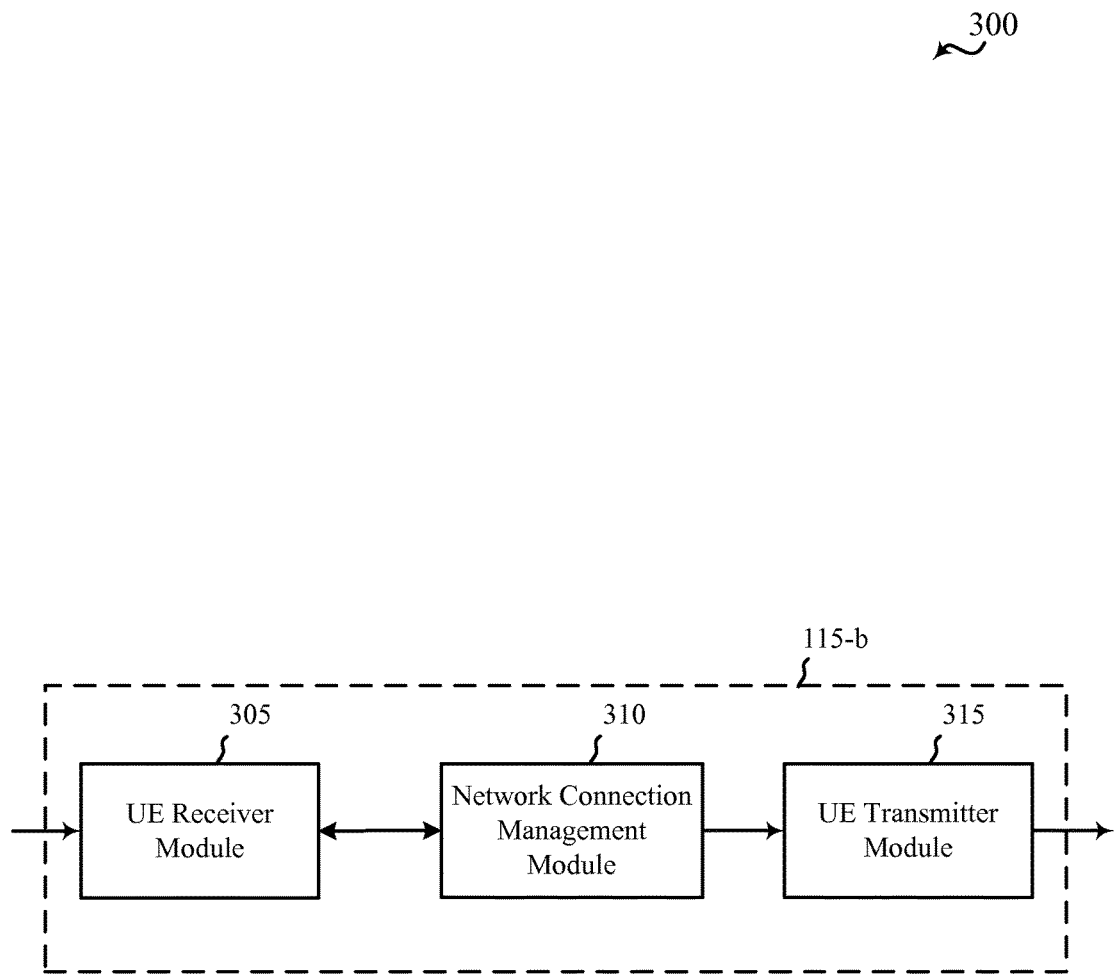
FIGS. 3-5 show block diagram of devices for use in detecting a communications network, in accordance with various aspects of the present disclosure.

FIG. 3 shows a block diagram 300 of a device 115-b for use in detecting a communications network, in accordance with various aspects of the present disclosure. In some embodiments, the device 115-b may be an example of one or more aspects of the UEs 115 described with reference to FIG. 1. The device 115-b may also be a processor. The device 115-b may include a UE receiver module 305, a network connection management module 310, and/or a UE transmitter module 315. Each of these components may be in communication with each other.

The components of the device 115-*b* may, individually or collectively, be implemented using application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors.

In some embodiments, the UE receiver module 305 may be or include a number of radio frequency (RF) receivers, such as a WWAN receiver (e.g., a cellular receiver) and a WLAN receiver. The UE receiver module 305 may be used to receive various types of data and/or control signals (i.e., transmissions) over communication links (e.g., physical channels) of a wireless communications system, such as one or more communications links 125 of the wireless communications system 100 described with reference to FIG. 1.

In some embodiments, the UE transmitter module 315 may be or include a number of RF transmitters, such as a WWAN transmitter (e.g., a cellular transmitter) and a WLAN transmitter. The transmitter module 315 may be used to transmit various types of data and/or control signals (i.e., transmissions) over communication links (e.g., physical channels) of a wireless communications system, such as one or more communication links of the wireless communications system 100.

In some embodiments, the network connection management module 310 may be used to detect an availability of one network based on transmissions received over another network.

Figure 4:
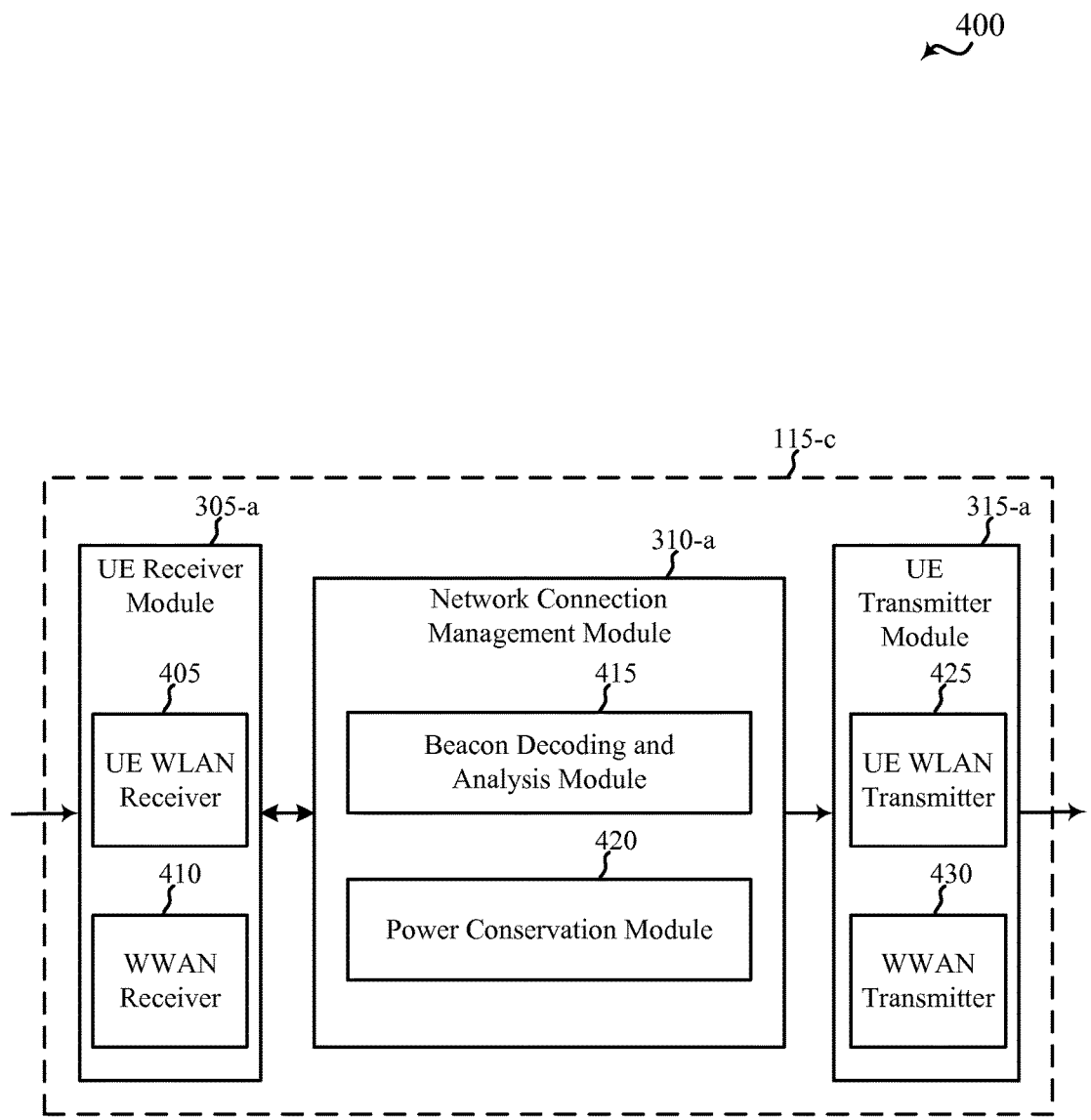

FIG. 4 shows a block diagram 400 of a device 115-*c* for use in detecting a communications network, in accordance with various aspects of the present disclosure. In some embodiments, the device 115-*c* may be an example of one or more aspects of the UEs 115 described with reference to FIGS. 1 and/or 2. The device 115-*c* may also be a processor. The device 115-*c* may include a UE receiver module 305-*a*, a network connection management module 310-*a*, and/or a UE transmitter module 315-*a*. Each of these components may be in communication with each other.

The components of the device 115-*c* may, individually or collectively, be implemented using ASICs adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the UE receiver module 305-*a* may be an example of one or more aspects of the UE receiver module 305 described with reference to FIG. 3, and may be or include a number of radio frequency (RF) receivers, such as a UE WLAN receiver 405 and a WWAN receiver 410 (e.g., a cellular receiver). The UE receiver module 305-*a* may be used to receive various types of data and/or control signals (i.e., transmissions) over communication links (e.g., physical channels) of a wireless communications system, such as one or more communications links 125 of the wireless communications system 100 described with reference to FIG. 1.

In some embodiments, the UE transmitter module 315-*a* may be an example of one or more aspects of the transmitter module 315 described with reference to FIG. 3, and may be or include a number of RF transmitters, such as a UE WLAN transmitter 425 and a WWAN transmitter 430 (e.g., a cellular transmitter). The UE transmitter module 315-*a* may be used to transmit various types of data and/or control signals (i.e., transmissions) over communication links (e.g., physical channels) of a wireless communications system, such as one or more communication links of the wireless communications system 100.

In some embodiments, the network connection management module 310-*a* may be an example of one or more aspects of the network connection management module 310 described with reference to FIG. 3, and may include a beacon decoding and analysis module 415 and/or a power conservation module 420. Each of these components may be in communication with each other.

In some embodiments, the beacon decoding and analysis module 415 may be used to identify an information element (IE) in a beacon, such as a beacon frame in WLAN, received from a device over a WLAN (e.g., via the UE WLAN receiver 405). In some cases, identifying the IE may include decoding the beacon to identify the IE. In some cases, the UE is not logged in to and/or actively communicating with, such as by exchanging data with, the device over the WLAN, and/or another device or network, when the beacon is received. The IE may indicate an availability of another network (e.g., a network other than the WLAN, such a WWAN or cellular network). The IE may in some cases include data such as band, channel, system time, and PLMN identification information for a PLMN. The band, channel, and PLMN identification information may assist the device 115-*c* in connecting to the other network. The PLMN identification information may include system identification (SID) and/or network identification (NID) information. In other cases, the IE may be empty (i.e., not include data). An empty IE may indicate that the other network is not available.

In some embodiments, the power conservation module 420 may be used to enter a sleep mode when the IE is empty. The sleep mode may include, for example, a powering down of (e.g., turning off) the WWAN receiver 410 and/or the WWAN transmitter 430 or transitioning the WWAN receiver 410 and/or the WWAN transmitter 430 to a low power state. The power conservation module 420 may also power up the WWAN receiver 410 and/or the WWAN transmitter 430 (e.g., enter an active mode) when an IE includes data indicating that another network is available.

Figure 5:
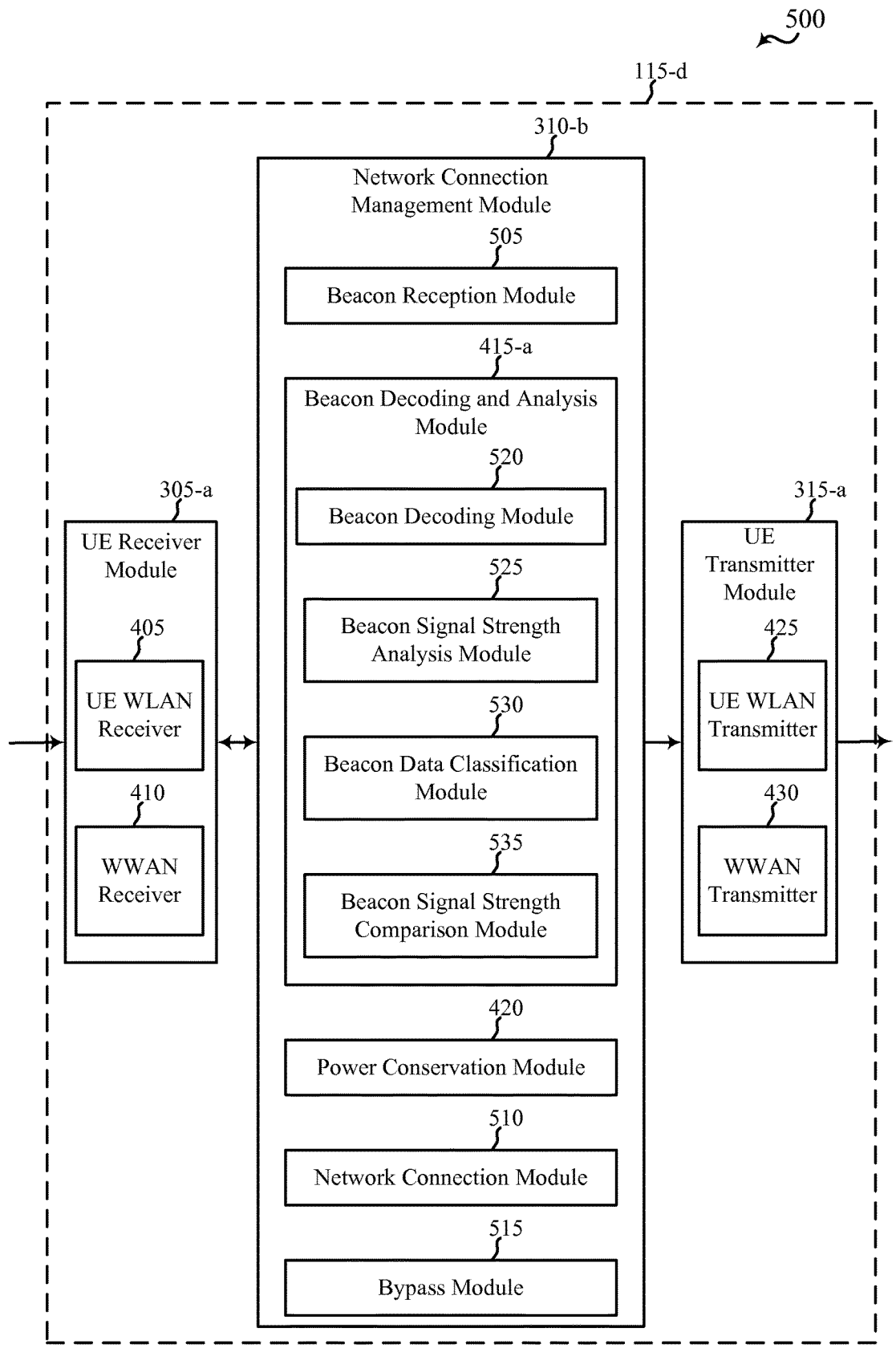

FIG. 5 shows a block diagram 500 of a device 115-*d* for use in detecting a communications network, in accordance with various aspects of the present disclosure. In some embodiments, the device 115-*d* may be an example of one or more aspects of the UEs 115 described with reference to FIGS. 1 and/or 2. The device 115-*d* may also be a processor. The device 115-*d* may include a UE receiver module 305-*a*, a network connection management module 310-*a*, and/or a UE transmitter module 315-*a*. Each of these components may be in communication with each other.

The components of the device 115-*d* may, individually or collectively, be implemented using ASICs adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the UE receiver module 305-*a* and the UE transmitter module 315-*a* may be configured as described with reference to FIGS. 3 and/or 4.

In some embodiments, the network connection management module 310-*b* may be an example of one or more aspects of the network connection management module 310 described with reference to FIGS. 3 and/or 4, and may include a beacon reception module 505, a beacon decoding and analysis module 415-*a*, a power conservation module 420, a network connection module 510, and/or a bypass module 515. Each of these components may be in communication with each other.

In some embodiments, the beacon reception module 505 may be used to determine whether a beacon is received from a device (e.g., a WLAN access point such as one of the WLAN access points 105 described with reference to FIG. 1) over a WLAN (e.g., via the UE WLAN receiver 405). Upon determining that a beacon is received, the beacon reception module 505 may notify the beacon decoding and analysis module 415-*a*. Alternatively, the beacon reception module 505 may determine whether a network other than the WLAN (e.g., a WWAN or cellular network) is out of service before notifying the beacon decoding and analysis module 415-*a* that a beacon has been received.

In some embodiments, the beacon decoding and analysis module 415-*a* may be an example of one or more aspects of the beacon decoding and analysis module 415 described with reference to FIG. 4 and may include a beacon decoding module 520, a beacon signal strength analysis module 525, a beacon data classification module 530, and/or a beacon signal strength comparison module 535. Each of these components may be in communication with each other.

In some embodiments, the beacon decoding module 520 may be used to identify an IE in a received beacon. In some cases, identifying the IE includes decoding the received beacon to identify the IE in the beacon. The IE may indicate an availability of another network (e.g., a network other than the WLAN, such a WWAN or cellular network). The IE may in some cases include data such as band, channel, and PLMN identification information for a PLMN. The band, channel, and PLMN identification information may assist the device 115-*d* in connecting to the other network. In other cases, the IE may be empty (i.e., not include data). An empty IE may indicate that the other network is not available.

In some embodiments, the beacon signal strength analysis module 525 may be used to determine a signal strength of the beacon. The beacon data classification module 530 may then be used to classify the data in the IE as being reliable or unreliable based at least in part on the signal strength. In some cases, decoding the received beacon using the beacon decoding module 520 occurs after the beacon data classification module 530 classifies the data in the IE as being reliable.

In some embodiments, the beacon signal strength comparison module 535 may be used to compare the respective signal strengths of each of a plurality of beacons received by the device 115-*d*. In some cases, only the signal strengths of beacons with IEs including data may be compared, to identify a beacon with a greatest signal strength. The beacon signal strength comparison module 535 may indicate the identity of the beacon with a greatest signal strength to the network connection module 510, so that the network connection module 510 may connect to a network identified in the IE of the beacon with the greatest signal strength. It may be presumed, in some cases, that a beacon with the greatest signal strength was broadcast by a WLAN access point nearest the device 115-*d*, and that the network(s) identified by the nearest WLAN access point are most likely to provide the strongest signal to the device 115-*d*.

In some embodiments, the power conservation module 420 may be used to enter a sleep mode when the IE of a received beacon is empty. When the beacon signal strength analysis module 525 and beacon data classification module 530 are invoked, the power conservation module 420 may also enter the sleep mode when the data included in an IE of a beacon is unreliable (e.g., the data may be treated as if it was not received). The sleep mode may include, for example, a powering down of (e.g., turning off) the WWAN receiver 410 and/or the WWAN transmitter 430 or transitioning the WWAN receiver 410 and/or the WWAN transmitter 430 to a low power state. The power conservation module 420 may also be used to power up the WWAN receiver 410 and/or the WWAN transmitter 430 (e.g., enter an active mode) when an IE includes data indicating that another network is available. In some cases, the power conservation module 420 may only transition the device 115-*d* from the sleep mode to the active mode when an IE includes data that is indicated to be reliable.

In some embodiments, the network connection module 510 may be used to connect to another network using the data in a received IE. In some cases, the network connection module 510 may only connect to another network when the data in a received IE is determined to be reliable. Connecting to another network may in some cases include interrupting a protocol stack to request to latch to a band and channel identified by band, channel, and/or PLMN identification information in a received IE.

In some embodiments, the bypass module 515 may be used to bypass a High-Priority PLMN search and/or a better system reselection (BSR) scan when it is determined that a beacon is received from an access point classified as a near access point over the WLAN (e.g., because an IE of the beacon may already provide the device 115-*d* with the information that would have otherwise been obtained via the High-Priority PLMN search and/or BSR scan). It may be determined that the beacon was received from a near access point based on a signal strength received from the access point. In one embodiment, the beacon may be determined to have been received from a near access point based at least in part on a number of UEs connected to the access point. For example, if the number of UEs connected to the access point satisfies a threshold, the access point may be determined to be near the location of the UE that received the beacon. In another example, it may be determined that the beacon was received from a near access point based at least in part on whether the access point is identified as a preferred access point. For example, the UE may identify the access point from the received beacon. The UE may determine whether the access point is classified as a preferred access point based on the identity of the access point included in the beacon.

Figure 6:
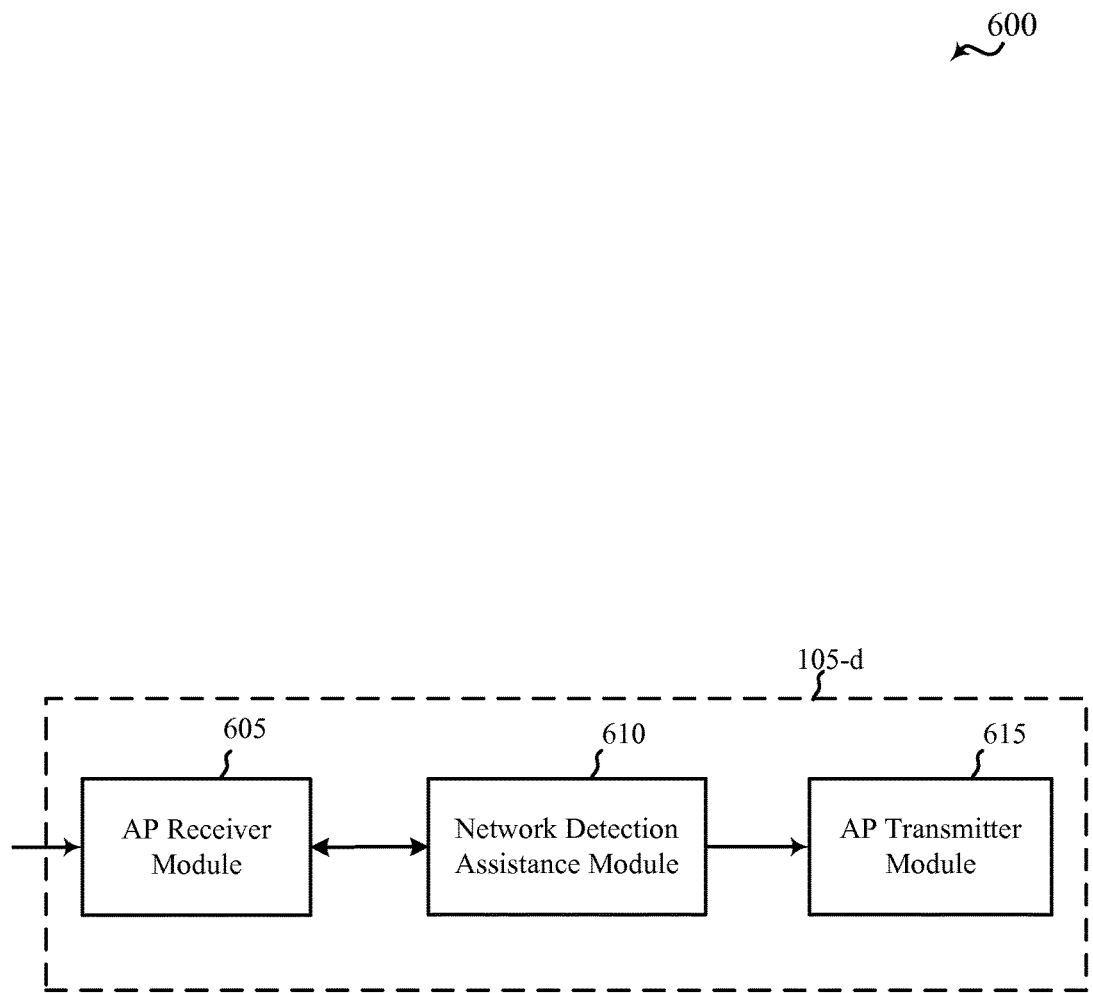
FIGS. 6-8 show block diagrams of devices for use in assisting a detection of a communications network, in accordance with various aspects of the present disclosure.

FIG. 6 shows a block diagram 600 of a device 105-*d* for use in assisting a detection of a communications network, in accordance with various aspects of the present disclosure. In some embodiments, the device 105-*d* may be an example of one or more aspects of the access points 105 described with reference to FIG. 1. The device 105-d may also be a processor. The device 105-d may include an AP receiver module 605, a network detection assistance module 610, and/or an AP transmitter module 615. Each of these components may be in communication with each other.

The components of the device 105-d may, individually or collectively, be implemented using ASICs adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the AP receiver module 605 may be or include a number of radio frequency (RF) receivers, such as a WLAN receiver and a back-end receiver (e.g., a wired and/or wireless Internet connection). The AP receiver module 605 may be used to receive various types of data and/or control signals (i.e., transmissions) over communication links (e.g., physical channels) of a wired and/or wireless communications system, such as one or more communications links 125 of the wireless communications system 100 described with reference to FIG. 1.

In some embodiments, the AP transmitter module 615 may be or include a number of RF transmitters, such as a WLAN transmitter and a back-end transmitter (e.g., a wired and/or wireless Internet connection). The AP transmitter module 615 may be used to transmit various types of data and/or control signals (i.e., transmissions) over communication links (e.g., physical channels) of a wired and/or wireless communications system, such as one or more communication links of the wireless communications system 100.

In some embodiments, the network detection assistance module 610 may be used to collect and/or maintain information indicating the availability of at least a first network, and to disseminate the information to other devices over a network other than the first network.

Figure 7:
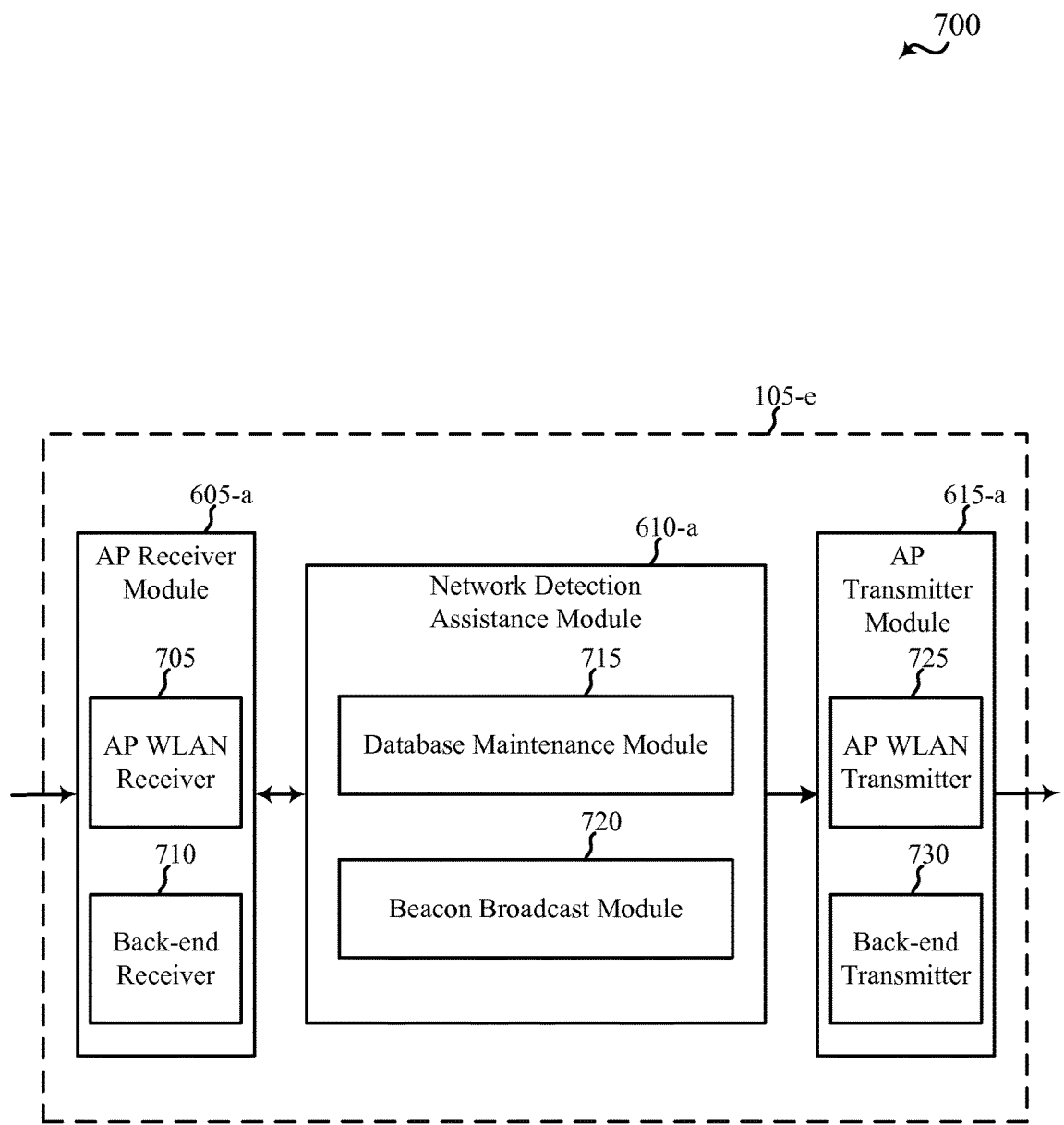

FIG. 7 shows a block diagram 700 of a device 105-e for use in assisting a detection of a communications network, in accordance with various aspects of the present disclosure. In some embodiments, the device 105-e may be an example of one or more aspects of the access points 105 described with reference to FIGS. 1 and/or 6. The device 105-e may also be a processor. The device 105-e may include an AP receiver module 605-a, a network detection assistance module 610-a, and/or an AP transmitter module 615-a. Each of these components may be in communication with each other.

The components of the device 105-e may, individually or collectively, be implemented using ASICs adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the AP receiver module 605-a may be an example of one or more aspects of the AP receiver module 605 described with reference to FIG. 6 and may be or include a number of radio frequency (RF) receivers, such as an AP WLAN receiver 705 and a back-end receiver 710 (e.g., a wired and/or wireless Internet connection). The AP receiver module 605-a may be used to receive various types of data and/or control signals (i.e., transmissions) over communication links (e.g., physical channels) of a wired and/or wireless communications system, such as one or more communications links 125 of the wireless communications system 100 described with reference to FIG. 1.

In some embodiments, the AP transmitter module 615-a may be an example of one or more aspects of the AP transmitter module 615 described with reference to FIG. 6 and may be or include a number of RF transmitters, such as an AP WLAN transmitter 725 and a back-end transmitter 730 (e.g., a wired and/or wireless Internet connection). The AP transmitter module 615-a may be used to transmit various types of data and/or control signals (i.e., transmissions) over communication links (e.g., physical channels) of a wired and/or wireless communications system, such as one or more communication links of the wireless communications system 100.

In some embodiments, the network detection assistance module 610-a may be an example of one or more aspects of the network detection assistance module 610 described with reference to FIG. 6, and may include a database maintenance module 715 and/or a beacon broadcast module 720. Each of these components may be in communication with each other.

In some embodiments, the database maintenance module 715 may be used to maintain a database including information indicating an availability of at least a first network.

The information may include band information, channel information, and/or PLMN information for each available radio access technology (RAT). The channel information may include a best channel of a certain location for each available RAT.

In some embodiments, the beacon broadcast module 720 may be used to access the database including the information indicating the availability of at least the first network, and to broadcast a beacon including an IE that indicates the availability of at least the first network. The beacon may be broadcast over a WLAN. A beacon having an empty IE may indicate that at least the first network is unavailable.

Figure 8:
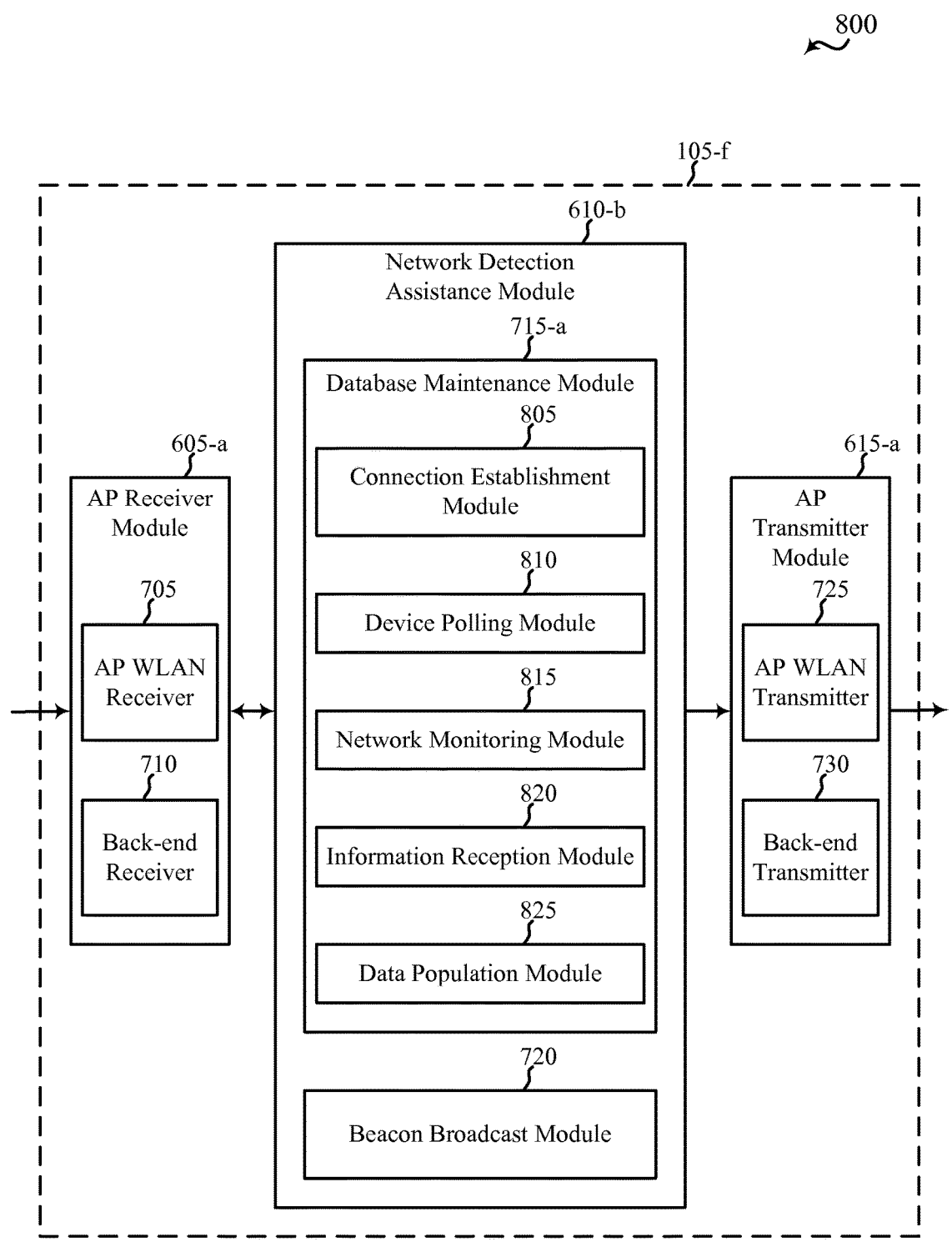

FIG. 8 shows a block diagram 800 of a device 105-f for use in assisting detection of a communications network, in accordance with various aspects of the present disclosure. In some embodiments, the device 105-f may be an example of one or more aspects of the access points 105 described with reference to FIGS. 1, 6, and/or 7. The device 105-f may also be a processor. The device 105-f may include an AP receiver module 605-a, a network detection assistance module 610-b, and/or an AP transmitter module 615-a. Each of these components may be in communication with each other.

The components of the device 105-f may, individually or collectively, be implemented using ASICs adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the AP receiver module 605-a and the AP transmitter module 615-a may be configured as described with reference to FIGS. 6 and/or 7.

In some embodiments, the network detection assistance module 610-b may be an example of one or more aspects of the network detection assistance module 610 described with reference to FIGS. 6 and/or 7, and may include a database maintenance module 715-a and/or a beacon broadcast module 720. Each of these components may be in communication with each other.

In some embodiments, the database maintenance module 715-a may be an example of one or more aspects of the database maintenance module 715 described with reference to FIG. 7 and may include a connection establishment module 805, a device polling module 810, a network monitoring module 815, an information reception module 820, and/or a data population module 825.

In some embodiments, the connection establishment module 805 may be used to establish a connection over a WLAN with at least one UE 115, such as one of the UEs described with reference to FIGS. 1, 3, 4, and/or 5. The connection over the WLAN may be established via the AP WLAN receiver 705 and/or AP WLAN transmitter 725. Alternately, or additionally, the connection establishment module 805 may be used to establish an Internet connection via a back-end connection (e.g., via the back-end receiver 710 and/or back-end transmitter 730).

In some embodiments, the device polling module 810 may be used to periodically poll at least one UE 115 over the WLAN connection established by the connection establishment module 805. The at least one UE 115 may be polled for information indicating the availability of at least the first network.

In some embodiments, the network monitoring module 815 may be used to periodically monitor at least the first network. In some cases, the first network is monitored via the Internet connection which may be made over a back-end mobile station modem (MSM), such as world-mode MSM (e.g., an LTE, WCDMA, GSM, CDMA, or other MSM). The MSM may in some cases periodically monitor all accessible RATs for information indicating the availability of communications networks.

In some embodiments, the information reception module 820 may be used to receive the information indicating availability of at least the first network.

In some embodiments, the data population module 825 may be used to populate a database with the information received from the at least one UE and/or at least the first network. In some cases, the database may be populated based on the periodic polling of the device polling module 810 and/or the periodic monitoring of the network monitoring module 815. The information populated into the database may include band information, channel information, and/or PLMN information for each available radio access technology (RAT). The channel information may include a best channel of a certain location for each available RAT.

In some embodiments, the beacon broadcast module 720 may be used to access the database including the information indicating the availability of at least the first network, and to broadcast a beacon including an IE that indicates the availability of at least the first network. The beacon may be broadcast over the WLAN. A beacon having an empty IE may indicate that at least the first network is unavailable.

Figure 9:
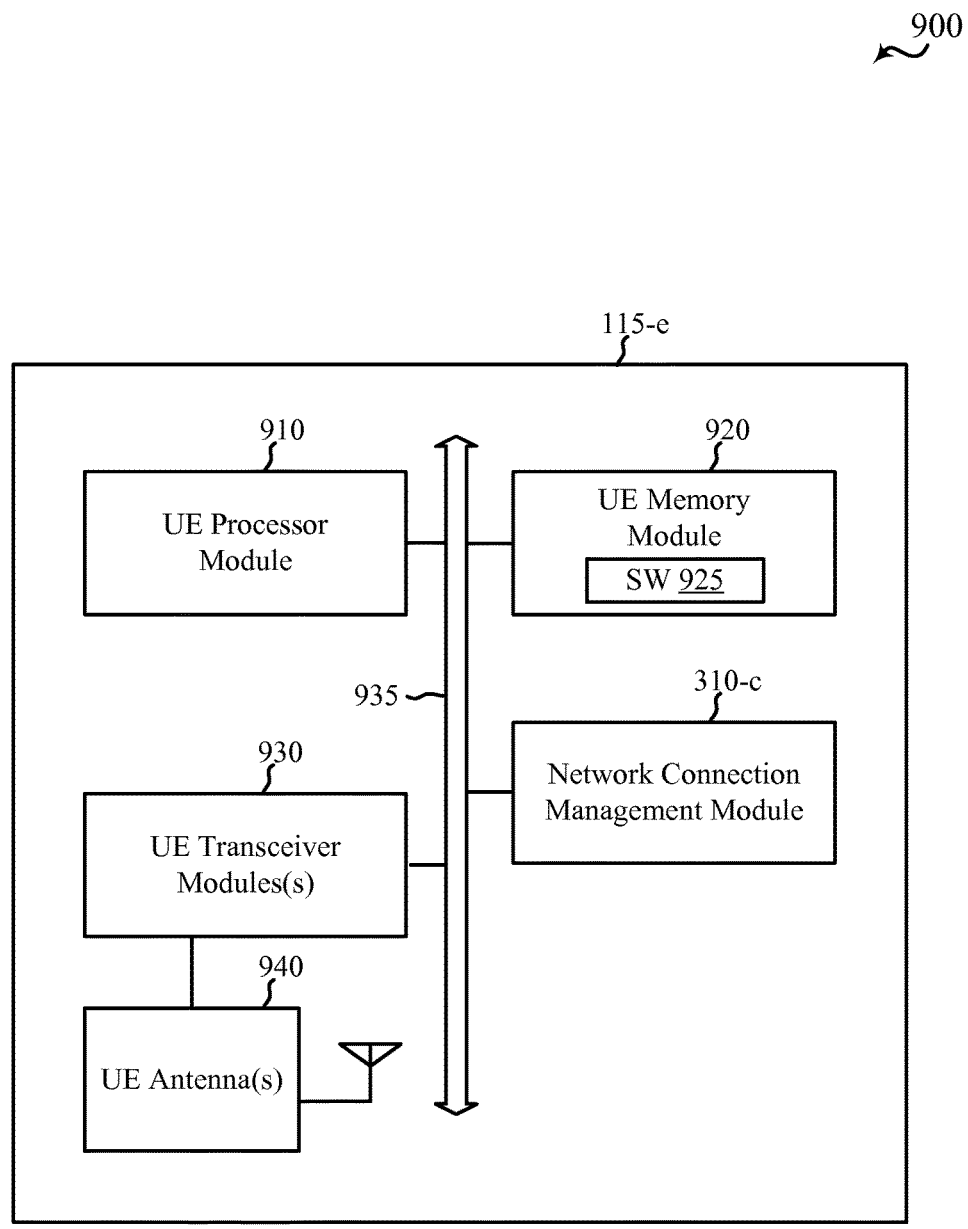
FIG. 9 shows a block diagram of a UE configured for wireless communication, in accordance with various aspects of the present disclosure.

FIG. 9 shows a block diagram 900 of a UE 115-e configured for wireless communication, in accordance with various aspects of the present disclosure. The UE 115-e may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 115-e may in some cases have an internal power supply (not shown), such as a small battery, to facilitate mobile operation. In some embodiments, the UE 115-e may be an example of one or more aspects of one of the devices 115 described with reference to FIGS. 1, 3, 4, and/or 5. The UE 115-e may be configured to implement at least some of the features and functions described with reference to FIGS. 1, 2B, 3, 4, and/or 5. The UE 115-e may be configured to communicate with at least one of the access points or devices 105 described with reference to FIGS. 1, 6, 7, and/or 8.

The UE 115-e may include a UE processor module 910, a UE memory module 920, at least one transceiver module (represented by UE transceiver module(s) 930), at least one antenna (represented by UE antenna(s) 940), and/or a network connection management module 310-c. Each of these components may be in communication with each other, directly or indirectly, over at least one bus 935.

The UE memory module 920 may include random access memory (RAM) and/or read-only memory (ROM). The UE memory module 920 may store computer-readable, computer-executable software (SW) code 925 containing instructions that are configured to, when executed, cause the UE processor module 910 to perform various functions described herein for communicating over a wireless communications system and/or detecting a communications network. Alternatively, the software code 925 may not be directly executable by the UE processor module 910 but be configured to cause the UE 115-e (e.g., when compiled and executed) to perform various functions described herein.

The UE processor module 910 may include an intelligent hardware device, e.g., a central processing unit (CPU), a microcontroller, an ASIC, etc. The UE processor module 910 may process information received through the UE transceiver module(s) 930 and/or information to be sent to the UE transceiver module(s) 930 for transmission through the UE antenna(s) 940. The UE processor module 910 may handle, alone or in connection with the network connection management module 310-c, various aspects of communicating over a wireless communications system and/or detecting a communications network.

The UE transceiver module(s) 930 may include a modem configured to modulate packets and provide the modulated packets to the UE antenna(s) 940 for transmission, and to demodulate packets received from the UE antenna(s) 940. The UE transceiver module(s) 930 may in some cases be implemented as at least one transmitter module and at least one separate receiver module. The UE transceiver module(s) 930 may support communications in a first spectrum, such as a WWAN or cellular spectrum, and in a second spectrum, such as a WLAN spectrum. The UE transceiver module(s) 930 may be configured to communicate bi-directionally, via the UE antenna(s) 940, with at least one of the access points or devices 105 (e.g., eNBs and/or WLAN access points) described with reference to FIGS. 1, 6, 7, and/or 8. While the UE 115-e may include a single antenna, there may be embodiments in which the UE 115-e may include multiple UE antennas 940.

The network connection management module 310-c may be an example of one or more aspects of the network connection management module 310 described with reference to FIGS. 3, 4, and/or 5 and may be configured to perform and/or control some or all of the features and/or functions described with reference to FIGS. 1, 2B, 3, 4, and/or 5 related to detection of a communications network. The network connection management module 310-*c*, or portions of it, may include a processor, and/or some or all of the functionality of the network connection management module 310-*c* may be performed by the UE processor module 910 and/or in connection with the UE processor module 910.

Figure 10:
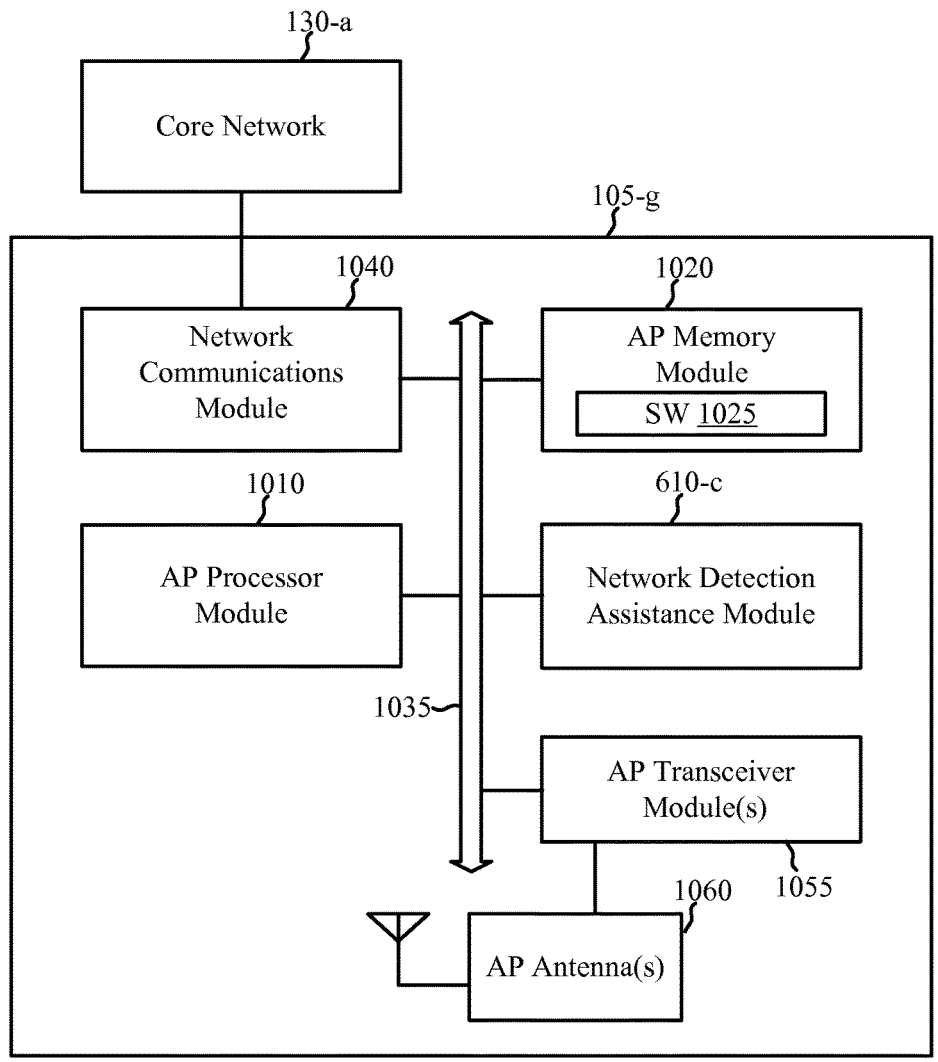
FIG. 10 shows a block diagram illustrating a WLAN access point configured for wireless communication, in accordance with various aspects of the present disclosure.

FIG. 10 shows a block diagram 1000 illustrating a WLAN access point 105-*g* configured for wireless communication, in accordance with various aspects of the present disclosure. In some embodiments, the WLAN access point 105-*g* may be an example of one or more aspects of one of the access points or devices 105 described with reference to FIGS. 1, 6, 7, and/or 8. The WLAN access point 105-*g* may be configured to implement at least some of the features and functions described with reference to FIGS. 1, 2B, 6, 7, and/or 8. The WLAN access point 105-*g* may include an AP processor module 1010, an AP memory module 1020, at least one transceiver module (represented by AP transceiver module(s) 1055), at least one antenna (represented by AP antenna(s) 1060), and/or network detection assistance module 610-*c*. The WLAN access point 105-*g* may also include a network communications module 1040. Each of these components may be in communication with each other, directly or indirectly, over at least one bus 1035.

The AP memory module 1020 may include RAM and/or ROM. The AP memory module 1020 may store computer-readable, computer-executable software (SW) code 1025 containing instructions that are configured to, when executed, cause the AP processor module 1010 to perform various functions described herein for assisting other devices in detecting a communications network. Alternatively, the software code 1025 may not be directly executable by the AP processor module 1010 but be configured to cause the WLAN access point 105-*g* (e.g., when compiled and executed) to perform various functions described herein.

The AP processor module 1010 may include an intelligent hardware device, e.g., a CPU, a microcontroller, an ASIC, etc. The AP processor module 1010 may process information received through the AP transceiver module(s) 1055 and/or the network communications module 1040. The AP processor module 1010 may also process information to be sent to the AP transceiver module(s) 1055 for transmission through the AP antenna(s) 1060 or to the network communications module 1040 for transmission to a network 1045 (e.g., the Internet, or a core network such as the core network 130 described with reference to FIG. 1). The AP processor module 1010 may handle, alone or in connection with the network detection assistance module 610-*c*, various aspects of communicating over a wireless communications system and/or assisting other devices with network detection.

The AP transceiver module(s) 1055 may include a modem configured to modulate packets and provide the modulated packets to the AP antenna(s) 1060 for transmission, and to demodulate packets received from the AP antenna(s) 1060. The AP transceiver module(s) 1055 may in some cases be implemented as at least one transmitter module and at least one separate receiver module. The AP transceiver module(s) 1055 may support communications in a first spectrum, such as a WLAN spectrum, and in some cases a second spectrum, such as a WWAN spectrum. The AP transceiver module(s) 1055 may be configured to communicate bi-directionally, via the AP antenna(s) 1060, with at least one of the UEs or devices 115 described with reference to FIGS. 1, 3, 4, and/or 5, for example. The WLAN access point 105-*g* may typically include multiple AP antennas 1060 (e.g., an antenna array). The WLAN access point 105-*g* may communicate with the network(s) 130-*a* through the network communications module 1040.

The network detection assistance module 610-*c* may be an example of one or more aspects of the network detection assistance module 610 described with reference to FIGS. 6, 7, and/or 8 and may be configured to perform some or all of the features and/or functions described with reference to FIGS. 1, 2B, 6, 7, and/or 8 related to assisting other devices with detecting a communications network. The network detection assistance module 610-*c*, or portions of it, may include a processor, and/or some or all of the functionality of the network detection assistance module 610-*c* may be performed by the AP processor module 1010 and/or in connection with the AP processor module 1010.

Figure 11:
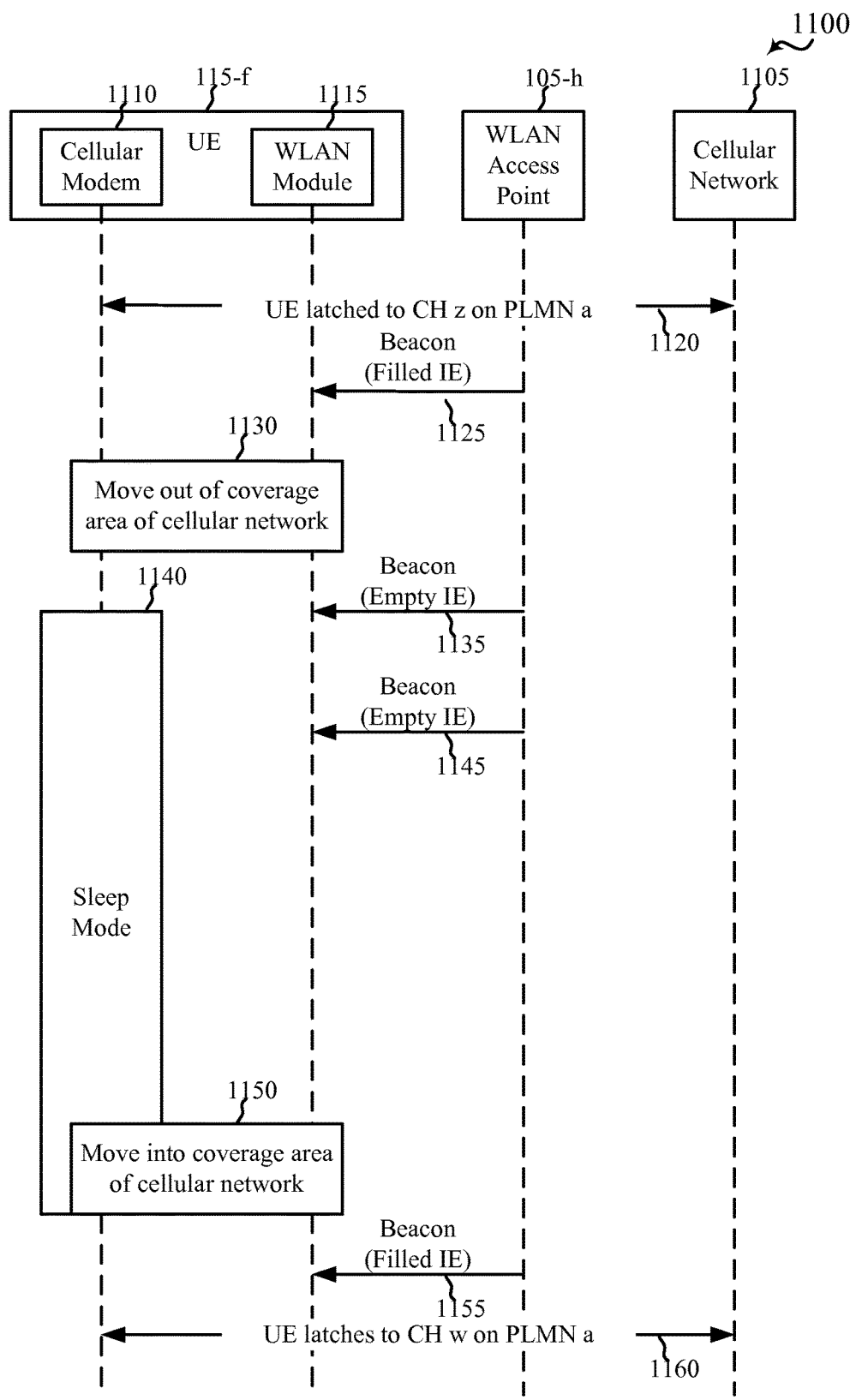
FIG. 11 is a message flow diagram illustrating wireless communications between a UE, a number of WLAN access points, and a cellular network.

FIG. 11 is a message flow diagram 1100 illustrating wireless communications between a UE 115-*f*, a number of WLAN access points 105-*h*, and a cellular network 1105. The UE 115-*f* may be an example of one of the UEs or devices 115 described with reference to FIGS. 1, 3, 4, 5, and/or 9 and may include a cellular modem 1110 and a WLAN module 1115. The WLAN access point(s) 105-*h* may be examples of ones of the access points 105 described with reference to FIGS. 1, 6, 7, 8, and/or 10.

By way of example, the message flow may begin with communications 1120, which may occur while the UE 115-*f* is latched to a Channel z (Ch z) on a PLMN associated with the cellular network 1105. While latched to the cellular network 1105, the UE 115-*f* may ignore a beacon 1125 received from at least one of the WLAN access point(s) 105-*h*, unless the UE 115-*f* desires to establish or maintain a connection with one of the WLAN access points 105-*h*, in which case the WLAN module 1115 may decode the beacon 1125. In the latter case, the UE 115-*f* may ignore an IE included in the beacon 1125 for the purpose of identifying the availability of the cellular network 1105.

During a time 1130, the UE 115-*f* may be moved to a location or locations outside the coverage area of the cellular network 1105, thereby resulting in loss of the UE's connection with the cellular network 1105. While outside the coverage area of the cellular network 1105, the UE 115-*f* may begin to scan for cellular service. However, at some point in time, the UE 115-*f* may receive a beacon 1135 from one of the WLAN access point(s) 105-*h*. Because the UE 115-*f* has lost cellular coverage, the UE 115-*f* may cause the WLAN module 1115 to decode the beacon 1135 and determine whether it includes an IE that identifies the availability of another cellular network. After determining that the relevant IE of the beacon 1135 is empty, the UE 115-*f* may enter a sleep mode 1140, in which the cellular modem 1110 of the UE 115-*f* is powered down or turned OFF to conserve power.

While in the sleep mode, the UE 115-*f* may receive at least one additional beacon 1145 in which the relevant IEs are empty, thereby indicating that the WLAN access point(s) 105-*h* are unaware of an available cellular network. Because the IEs are empty, the UE 115-*f* may remain in the sleep mode.

During a time 1150, the UE 115-*f* may be moved back inside the coverage area of the cellular network 1105. At this point, the UE 115-*f* may receive a beacon 1155 from one of the WLAN access point(s) 105-*h* and determine that it has an IE indicating that the cellular network 1105 is available. At this point, the UE 115-*f* may be transitioned from the sleep mode 1140 to an active mode, and the UE 115-*f* may latch to the cellular network 1105. In some cases, and at a time 1160, the UE 115-*f* may latch to the cellular network 1105 using information (e.g., band, channel, and/or PLMN identification information) contained in the IE of the beacon 1155.

Figure 12:
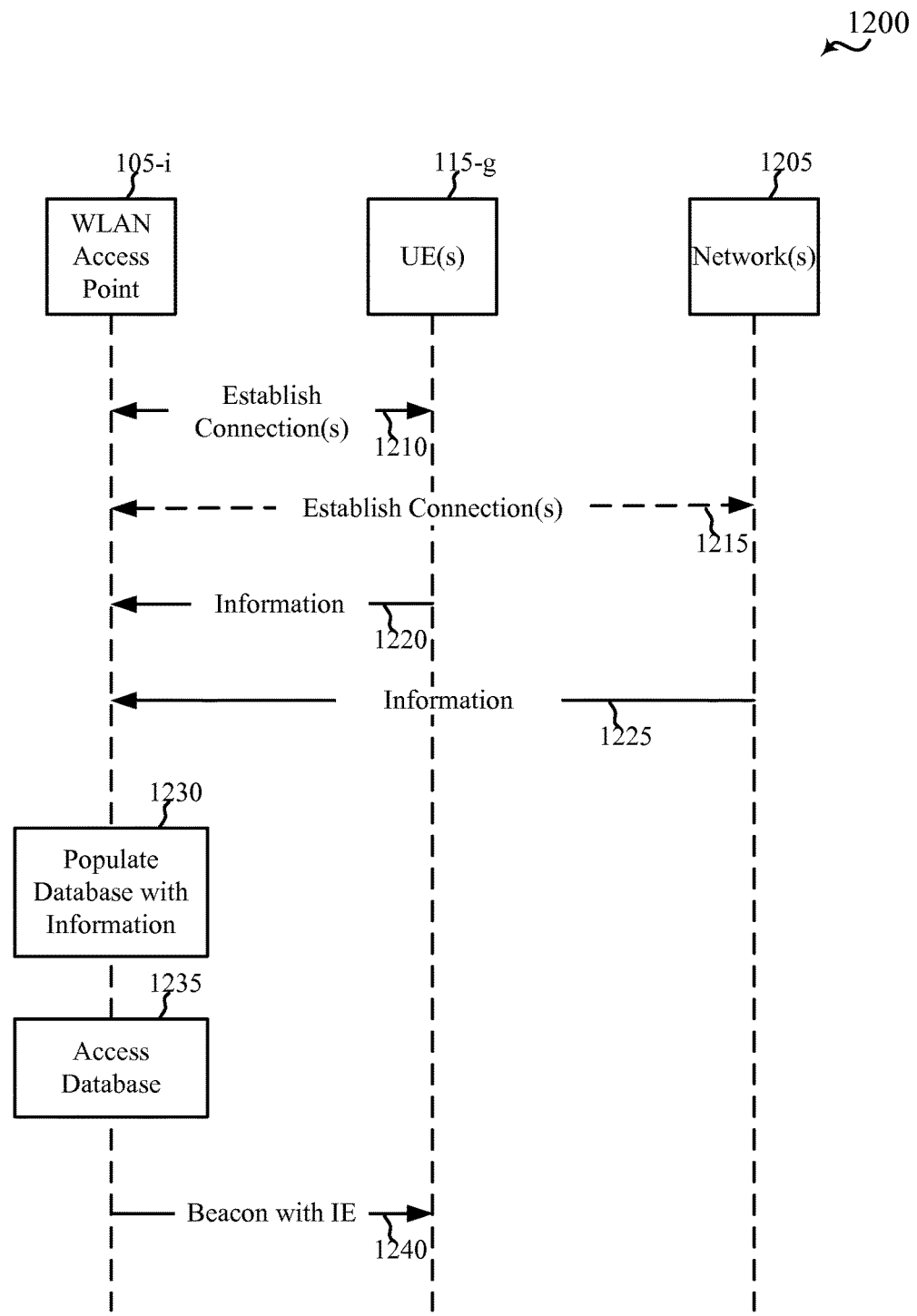
FIG. 12 is a message flow diagram illustrating wireless communications between a WLAN access point, at least one UE, and at least one network.

FIG. 12 is a message flow diagram 1200 illustrating wireless communications between a WLAN access point 105-*i*, at least one UE 115-*g*, and at least one network 1205 (e.g., the Internet and/or a cellular core network). The WLAN access point 105-*i* may be an example of one of the access points 105 described with reference to FIGS. 1, 6, 7, 8, 10, and/or 11. The UE(s) 115-*g* may be examples of the UEs or devices 115 described with reference to FIGS. 1, 3, 4, 5, 9, and/or 11.

By way of example, the message flow may begin with the WLAN access point 105-*i* establishing communications 1210, 1215 with one or both of the UE(s) 115-*g* and the network(s) 1205. In some cases, establishing a connection 1215 with the network(s) 1205 is not necessary. System information about the network(s) 1205 may be received in a number of ways, such as through a broadcast message. Subsequent to establishing a connection or connections with the UE(s) 115-*g* and/or the network(s) 1205, the WLAN access point 105-*i* may poll for, monitor, and/or receive information 1220, 1225 from the UE(s) 115-*g* and/or the network(s) 1205. The information may include band information, channel information, and/or PLMN information for each available RAT. The channel information may include a best channel of a certain location for each available RAT At block 1230, the WLAN access point 105-*i* may populate a database using the information it receives.

At block 1235, the WLAN access point 105-*i* may access the database to retrieve information for inclusion in an IE of a beacon 1240. The beacon 1240 may be received by the UE(s) 115-*g* and used, and may be used by at least one UE 115-*g* in a sleep mode to reconnect with a network (e.g., a cellular network) identified in the relevant IE.

Figure 13:
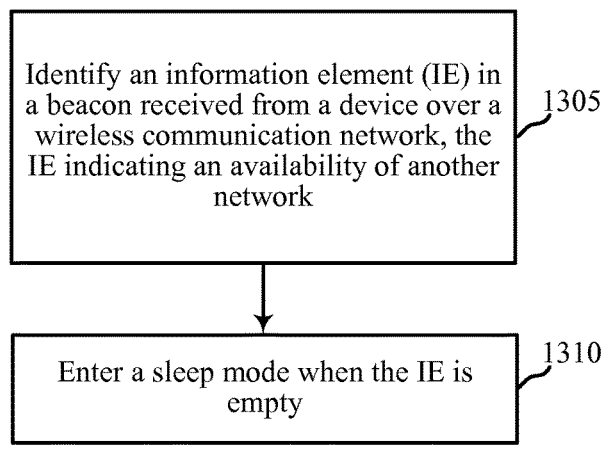
FIGS. 13-16 are flow charts illustrating examples of methods for detecting a communications network, in accordance with various aspects of the present disclosure.

FIG. 13 is a flow chart illustrating an example of a method 1300 for detecting a communications network, in accordance with various aspects of the present disclosure. For clarity, the method 1300 is described below with reference to one or more aspects of one of the devices 115 (e.g., UEs) described with reference to FIGS. 1, 3, 4, 5, 9, 11, and/or 12. In some embodiments, a device such as one of the devices 115 may execute at least one set of codes to control the functional elements of the device 115 to perform the functions described below.

At block 1305, an IE in a beacon received from a device 105 (e.g., a WLAN access point) over a wireless communication network, such as a WLAN, may be identified. The IE may indicate an availability of another network. The IE may in some cases include band, channel, and/or PLMN identification information for at least one PLMN. The other network may in some cases include a WWAN (e.g., a cellular network). The operation(s) at block 1305 may in some cases be performed using the network connection management module 310 described with reference to FIGS. 3, 4, 5, and/or 9, and/or the beacon decoding and analysis module 415 described with reference to FIGS. 4 and/or 5.

At block 1310, a sleep mode may be entered when the IE is empty. The operation(s) at block 1310 may in some cases be performed using the network connection management module 310 described with reference to FIGS. 3, 4, 5, and/or 9, and/or the power conservation module 420 described with reference to FIGS. 4 and/or 5.

Thus, the method 1300 may provide for detecting a communications network. It should be noted that the method 1300 is just one implementation and that the operations of the method 1300 may be rearranged or otherwise modified such that other implementations are possible.

Figure 14:
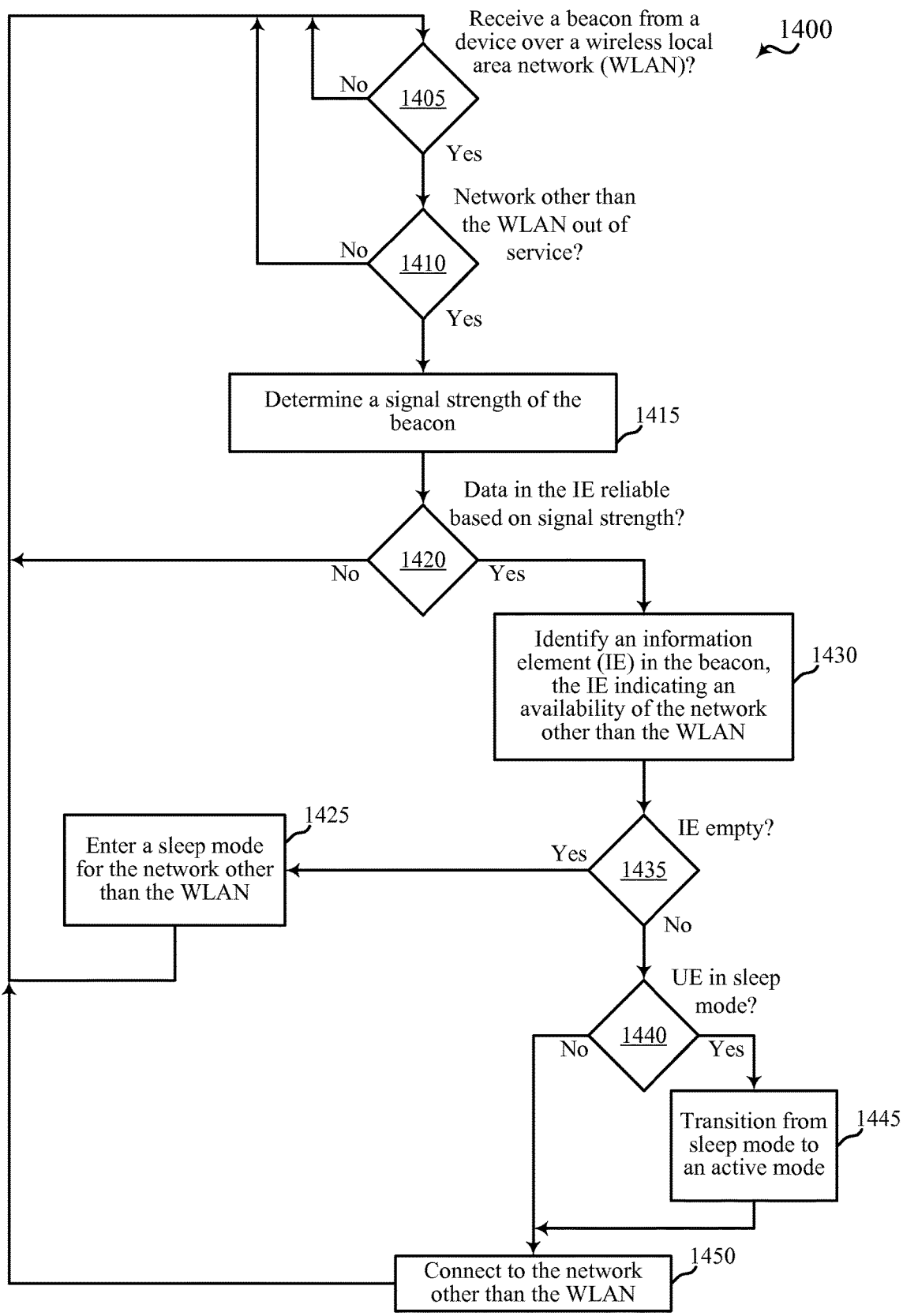

FIG. 14 is a flow chart illustrating an example of a method 1400 for detecting a communications network, in accordance with various aspects of the present disclosure. For clarity, the method 1400 is described below with reference to one or more aspects of one of the devices 115 (e.g., UEs) described with reference to FIGS. 1, 3, 4, 5, 9, 11, and/or 12. In some embodiments, a device such as one of the devices 115 may execute at least one set of codes to control the functional elements of the device 115 to perform the functions described below.

At block 1405, it may be determined whether a beacon is received from a device (e.g., a WLAN access point 105) over a wireless communication network, such as a WLAN. When a beacon is received, the method 1400 may proceed to block 1410. Otherwise, the method 1400 may loop back to block 1405. The operation(s) at block 1405 may in some cases be performed using the network connection management module 310 described with reference to FIGS. 3, 4, 5, and/or 9, and/or the beacon reception module 505 described with reference to FIG. 5.

At block 1410, it may be determined whether a network other than the WLAN is out of service. When the network other than the WLAN is out of service, the method 1400 may proceed to block 1415. Otherwise, the method 1400 may return to block 1405. The operation(s) at block 1410 may in some cases be performed using the network connection management module 310 described with reference to FIGS. 3, 4, 5, and/or 9, and/or the beacon reception module 505 described with reference to FIG. 5.

At block 1415 a signal strength of the beacon received from the device 105 may be determined. The operation(s) at block 1415 may in some cases be performed using the network connection management module 310 described with reference to FIGS. 3, 4, 5, and/or 9, the beacon decoding and analysis module 415 described with reference to FIGS. 4 and/or 5, and/or the beacon signal strength analysis module 525 described with reference to FIG. 5.

At block 1420, the data in the IE may be classified as being reliable or unreliable based at least in part on the signal strength determined at block 1415. When the data is classified as being unreliable, the method 1400 may return to block 1405. When the data is classified as being reliable, the method 1400 may proceed to block 1430. The operation(s) at block 1420 may in some cases be performed using the network connection management module 310 described with reference to FIGS. 3, 4, 5, and/or 9, the beacon decoding and analysis module 415 described with reference to FIGS. 4 and/or 5, and/or the beacon data classification module 530 described with reference to FIG. 5.

At block 1430, an IE in the beacon received from the device over the WLAN may be identified. The IE may indicate an availability of another network. The IE may in some cases include band, channel, and/or PLMN identification information for at least one PLMN, which information may assist a device 115 in connecting to the other network. The other network may in some cases include a WWAN (e.g., a cellular network).

At block 1435, it may be determined whether the IE is empty. When the IE is empty, the method 1400 may proceed to block 1425. Otherwise, the method 1400 may proceed to block 1440.

The operation(s) at block 1430 and/or block 1435 may in some cases be performed using the network connection management module 310 described with reference to FIGS.

3, 4, 5, and/or 9, the beacon decoding and analysis module 415 described with reference to FIGS. 4 and/or 5, and/or the beacon decoding module 520 described with reference to FIG. 5.

At block 1425, a sleep mode may be entered. The operation(s) at block 1425 may in some cases be performed using the network connection management module 310 described with reference to FIGS. 3, 4, 5, and/or 9, and/or the power conservation module 420 described with reference to FIGS. 4 and/or 5.

At block 1440, it may be determined whether a device 115 performing the method 1400 is in the sleep mode. When the device 115 is in the sleep mode, the device 115 may transition from the sleep mode to an active mode at block 1445. The device 115 may then connect to the network other than the WLAN network at block 1450. When the device 115 is determined not to be in a sleep mode at block 1440, the device 115 may also connect to the network other than the WLAN network at block 1450. Connecting to the network other than the WLAN network may in some cases include interrupting a protocol stack to request to latch to a band and channel identified by band, channel, and/or PLMN identification information in the IE identified at block 1415. The operation(s) at block 1440, 1445, and/or 1450 may in some cases be performed using the network connection management module 310 described with reference to FIGS. 3, 4, 5, and/or 9, and/or the network connection module 510 described with reference to FIG. 5.

Following the operation(s) at block 1425 and/or 1450, the method 1400 may return to block 1405 and wait for receipt of a subsequent beacon over the WLAN.

Thus, the method 1400 may provide for detecting a communications network. It should be noted that the method 1400 is just one implementation and that the operations of the method 1400 may be rearranged or otherwise modified such that other implementations are possible.

Figure 15:
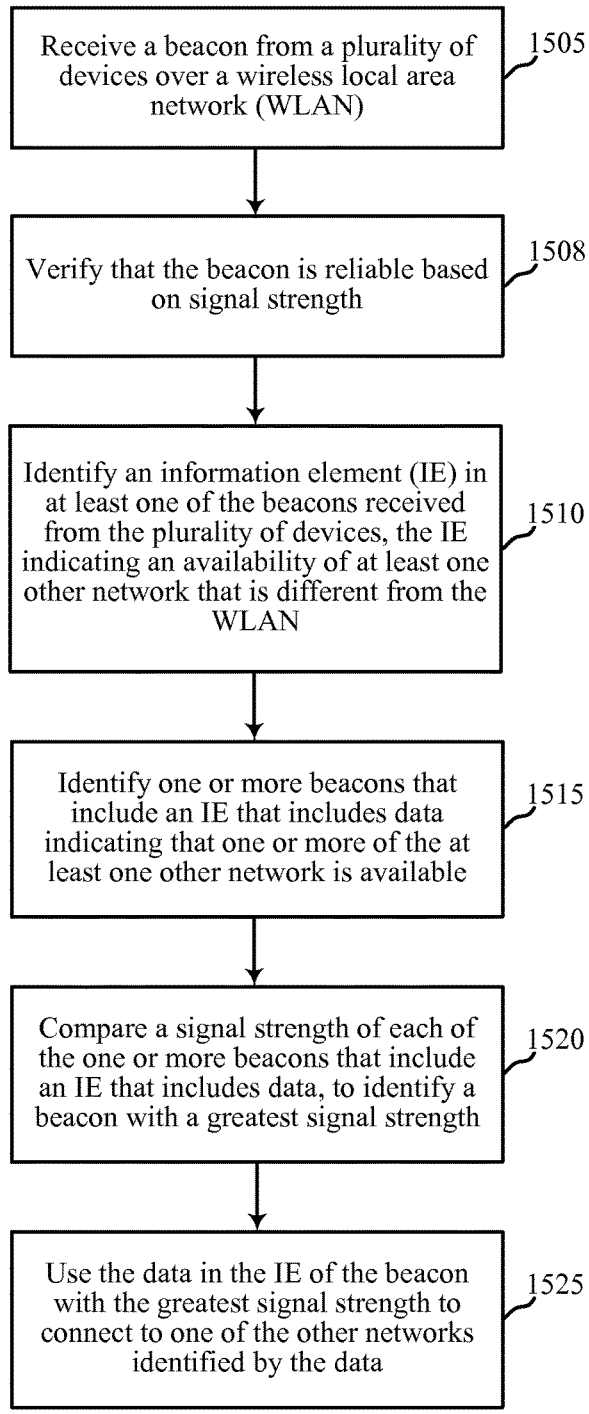

FIG. 15 is a flow chart illustrating an example of a method 1500 for detecting a communications network, in accordance with various aspects of the present disclosure. For clarity, the method 1500 is described below with reference to one or more aspects of one of the devices 115 (e.g., UEs) described with reference to FIGS. 1, 3, 4, 5, 9, 11, and/or 12. In some embodiments, a device such as one of the devices 115 may execute at least one set of codes to control the functional elements of the device 115 to perform the functions described below.

At block 1505, a beacon may be received from each of a plurality of devices (e.g., a plurality of WLAN access points 105) over a wireless communication network, such as a WLAN. The operation(s) at block 1505 may in some cases be performed using the network connection management module 310 described with reference to FIGS. 3, 4, 5, and/or 9, and/or the beacon reception module 505 described with reference to FIG. 5.

At block 1508, a signal strength of the beacon may be used to verify that the beacon is reliable. The operation(s) at block 1508 may in some cases be performed using the network connection management module 310 described with reference to FIGS. 3, 4, 5, and/or 9, the beacon decoding and analysis module 415 described with reference to FIG. 4, and/or the beacon signal strength analysis module 525 described with reference to FIG. 5.

At block 1510, an IE in at least one of the beacons received from the plurality of devices 105 may be identified. The IE may indicate an availability of at least one other network that is different from the WLAN. The IE may in some cases include band, channel, and/or PLMN identification information for at least one PLMN. The at least one other network may in some cases include a WWAN (e.g., a cellular network).

At block 1515, at least one beacon that includes an IE that includes data indicating that one or more of the at least one other network is available may be identified.

The operation(s) at block 1510 and/or block 1515 may in some cases be performed using the network connection management module 310 described with reference to FIGS. 3, 4, 5, and/or 9, the beacon decoding and analysis module 415 described with reference to FIGS. 4 and/or 5, and/or the beacon decoding module 520 described with reference to FIG. 5.

At block 1520, a signal strength of each of the at least one beacons that include an IE that includes data may be compared, to identify a beacon with a greatest signal strength. The operation(s) at block 1520 may in some cases be performed using the network connection management module 310 described with reference to FIGS. 3, 4, 5, and/or 9, the beacon decoding and analysis module 415 described with reference to FIGS. 4 and/or 5, and/or the beacon signal strength analysis module 525 and/or the beacon signal strength comparison module 535 described with reference to FIG. 5.

At block 1525, the data in the IE of the beacon with the greatest signal strength may be used to connect to one of the other networks identified by the data. The operation(s) at block 1525 may in some cases be performed using the network connection module 510 described with reference to FIG. 5.

Thus, the method 1500 may provide for detecting a communications network. It should be noted that the method 1500 is just one implementation and that the operations of the method 1500 may be rearranged or otherwise modified such that other implementations are possible.

Figure 16:
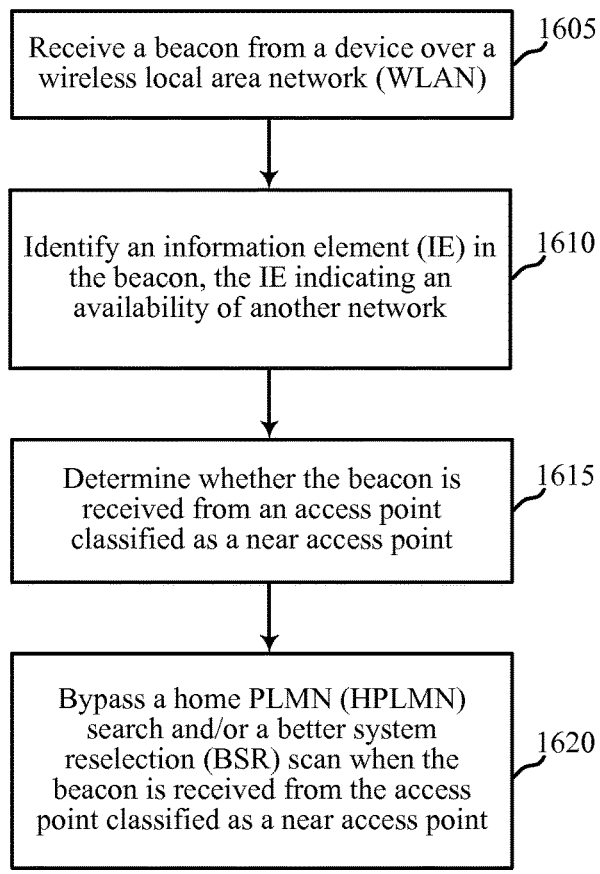

FIG. 16 is a flow chart illustrating an example of a method 1600 for detecting a communications network, in accordance with various aspects of the present disclosure. For clarity, the method 1600 is described below with reference to one or more aspects of one of the devices 115 (e.g., UEs) described with reference to FIGS. 1, 3, 4, 5, 9, 11, and/or 12. In some embodiments, a device such as one of the devices 115 may execute at least one set of codes to control the functional elements of the device 115 to perform the functions described below.

At block 1605, a beacon may be received from a device (e.g., a WLAN access point 105) over a wireless communication network, such as a WLAN. The operation(s) at block 1605 may in some cases be performed using the network connection management module 310 described with reference to FIGS. 3, 4, 5, and/or 9, and/or the beacon reception module 505 described with reference to FIG. 5.

At block 1610, an IE in the beacon received from the device 105 may be identified. The IE may indicate an availability of at least one other network that is different from the WLAN. The IE may in some cases include band, channel, and/or PLMN identification information for at least one PLMN. The at least one other network may in some cases include a WWAN (e.g., a cellular network). The operation(s) at block 1610 may in some cases be performed using the network connection management module 310 described with reference to FIGS. 3, 4, 5, and/or 9, the beacon decoding and analysis module 415 described with reference to FIGS. 4 and/or 5, and/or the beacon decoding module 520.

At block 1615, it may be determined whether the beacon is received from an access point classified as a near access point.

At block 1620, and when the beacon is received from the access point classified as a near access point, a High-Priority PLMN search and/or a BSR scan may be bypassed.

The operation(s) at block 1615 and/or block 1620 may in some cases be performed using the network connection management module 310 described with reference to FIGS. 3, 4, 5, and/or 9, and/or the network connection module 510.

Thus, the method 1600 may provide for detecting a communications network. It should be noted that the method 1600 is just one implementation and that the operations of the method 1600 may be rearranged or otherwise modified such that other implementations are possible.

One or more aspects of the method 1300, 1400, 1500, and/or 1600 may in some cases be combined.

Figure 17:
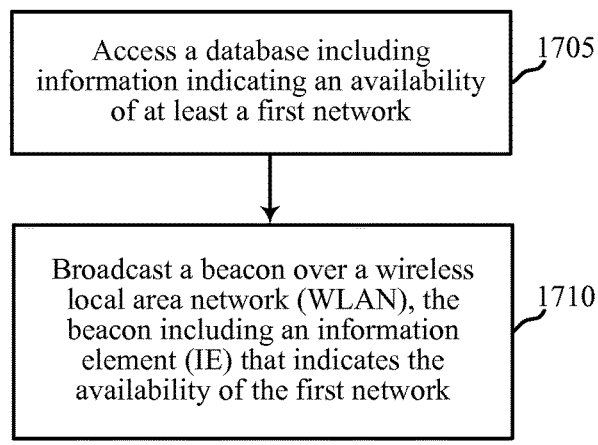
FIGS. 17-18 are flow charts illustrating examples of methods for assisting a detection of a communications network, in accordance with various aspects of the present disclosure.

FIG. 17 is a flow chart illustrating an example of a method 1700 for assisting a detection of a communications network, in accordance with various aspects of the present disclosure. For clarity, the method 1700 is described below with reference to one or more aspects of one of the devices 105 (e.g., a WLAN access point) described with reference to FIGS. 1, 6, 7, 8, 10, 11, and/or 12. In some embodiments, a device such as one of the devices 105 may execute at least one set of codes to control the functional elements of the device 105 to perform the functions described below.

At block 1705, a database including information indicating an availability of at least a first network may be accessed. The information may include band information, channel information, and/or PLMN information for each available RAT. The channel information may include a best channel of a certain location for each available RAT. The first network may in some cases include a WWAN (e.g., a cellular network). The operation(s) at block 1705 may in some cases be performed using the network detection assistance module 610 described with reference to FIGS. 6, 7, 8, and/or 10, and/or the database maintenance module 715 described with reference to FIGS. 7 and/or 8.

At block 1710, a beacon may be broadcast over a wireless communication network, such as a WLAN. The beacon may include an IE that indicates the availability of at least the first network. A beacon having an empty IE may indicate that at least the first network is unavailable. The operation(s) at block 1710 may in some cases be performed using the network detection assistance module 610 described with reference to FIGS. 6, 7, 8, and/or 10, and/or the beacon broadcast module 720 described with reference to FIGS. 7 and/or 8.

Thus, the method 1700 may provide for detecting a communications network. It should be noted that the method 1700 is just one implementation and that the operations of the method 1700 may be rearranged or otherwise modified such that other implementations are possible.

Figure 18:
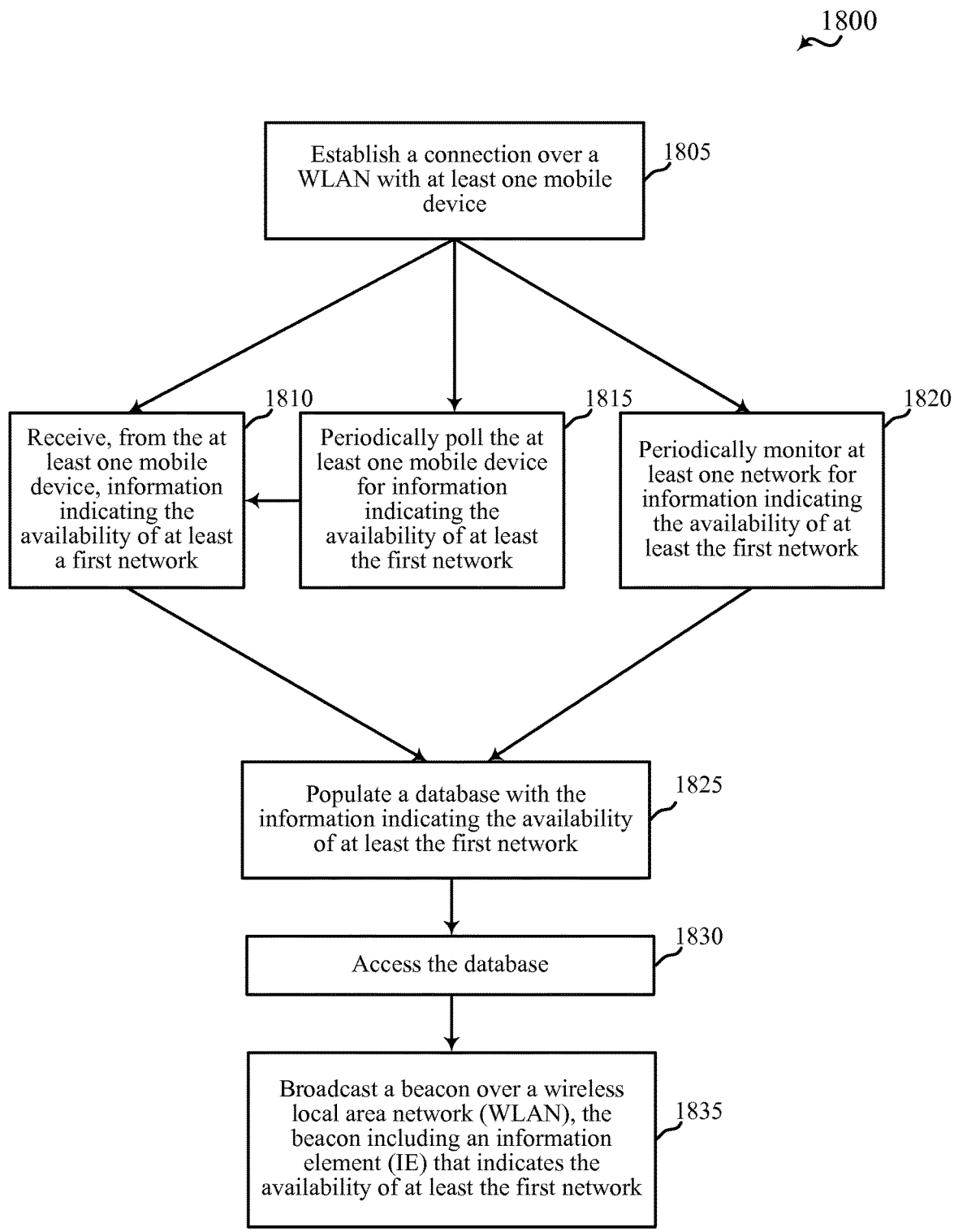

FIG. 18 is a flow chart illustrating an example of a method 1800 for assisting a detection of a communications network, in accordance with various aspects of the present disclosure. For clarity, the method 1800 is described below with reference to one or more aspects of one of the devices 105 (e.g., a WLAN access point) described with reference to FIGS. 1, 6, 7, 8, 10, 11, and/or 12. In some embodiments, a device such as one of the devices 105 may execute at least one set of codes to control the functional elements of the device 105 to perform the functions described below.

At block 1805, a connection may be established over a wireless communication network, such as a WLAN, with at least one UE. The operation(s) at block 1805 may in some cases be performed using the network detection assistance module 610 described with reference to FIGS. 6, 7, 8, and/or 10, the database maintenance module 715 described with reference to FIGS. 7 and/or 8, and/or the connection establishment module 805.

At block 1810, information indicating the availability of at least a first network may be received from the at least one UE 115. The information may include band information, channel information, and/or PLMN information for each available RAT. The channel information may include a best channel of a certain location for each available RAT. The first network may in some cases include a WWAN (e.g., a cellular network). The operation(s) at block 1810 may in some cases be performed using the network detection assistance module 610 described with reference to FIGS. 6, 7, 8, and/or 10, the database maintenance module 715 described with reference to FIGS. 7 and/or 8, and/or the information reception module 820.

At block 1815, the at least one UE 115 may be periodically polled for the information indicating the availability of at least the first network. The information indicating the availability of at least the first network may then be received from the at least one UE 115 at block 1810. The operation(s) at block 1815 may in some cases be performed using the network detection assistance module 610 described with reference to FIGS. 6, 7, 8, and/or 10, the database maintenance module 715 described with reference to FIGS. 7 and/or 8, and/or the device polling module 810.

At block 1820, at least the first network may be periodically monitored. The operation(s) at block 1820 may in some cases be performed using the network detection assistance module 610 described with reference to FIGS. 6, 7, 8, and/or 10, the database maintenance module 715 described with reference to FIGS. 7 and/or 8, and/or the network monitoring module 815.

At block 1825, a database may be populated with the information received from the at least one UE 115 and/or at least the first network. In some cases, the database may be populated based on the periodic polling at block 1815 and/or the periodic monitoring at block 1820. The operation(s) at block 1815 may in some cases be performed using the network detection assistance module 610 described with reference to FIGS. 6, 7, 8, and/or 10, the database maintenance module 715 described with reference to FIGS. 7 and/or 8, and/or the data population module 825.

At block 1830, the database may be accessed. The operation(s) at block 1830 may in some cases be performed using the network detection assistance module 610 described with reference to FIGS. 6, 7, 8, and/or 10, and/or the database maintenance module 715 described with reference to FIGS. 7 and/or 8.

At block 1835, a beacon may be broadcast over a wireless communication network, such as a WLAN. The beacon may include an IE that indicates the availability of at least the first network. An empty IE may indicate that at least the first network is unavailable. The operation(s) at block 1835 may in some cases be performed using the network detection assistance module 610 described with reference to FIGS. 6, 7, 8, and/or 10, and/or the beacon broadcast module 720 described with reference to FIGS. 7 and/or 8.

Thus, the method 1800 may provide for detecting a communications network. It should be noted that the method 1800 is just one implementation and that the operations of the method 1800 may be rearranged or otherwise modified such that other implementations are possible.

One or more aspects of the method 1700 and/or 1800 may in some cases be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The terms "example" and "exemplary," when used in this description, mean "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disc ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for detecting a communications network, comprising:
 identifying, at a user equipment (UE), an information element (IE) in a beacon received from a device over a first wireless communication network, the IE in the beacon indicating whether a second wireless communication network is available, wherein the second wireless communication network is a different radio access technology (RAT) from the first wireless communication network;
    entering, by the UE, a sleep mode when the IE in the beacon is empty; and
    bypassing scans on the second wireless communication network during the sleep mode until the UE receives a subsequent beacon over the first wireless communication network, the subsequent beacon containing an IE indicating that the second wireless communication network is available.

2. The method of claim 1, further comprising:
    entering an active mode when the IE in the beacon includes data.

3. The method of claim 1, wherein identifying the IE in the beacon comprises:
    decoding the beacon to identify the IE in the beacon.

4. The method of claim 1, further comprising:
    determining a signal strength of the beacon when the IE in the beacon includes data; and
    classifying the data in the IE in the beacon as being reliable based at least in part on the determined signal strength.

5. The method of claim 4, further comprising:
    connecting to the second wireless communication network using the data in the IE in the beacon when the data is classified as being reliable.

6. The method of claim 4, wherein the data in the IE in the beacon comprises at least one of band, channel, and public local mobile network (PLMN) identification information for the second wireless communication network.

7. The method of claim 6, further comprising:
    interrupting a protocol stack to request to latch to a band, channel, or PLMN identified by the band, channel, or PLMN identification information in the IE in the beacon.

8. The method of claim 1, further comprising:
    transitioning from the sleep mode to an active mode when the IE in the subsequent beacon includes data.

9. The method of claim 1, further comprising:
    determining whether the second wireless communication network is out of service; and
    identifying an IE in the beacon when the second wireless communication network is determined to be out of service.

10. The method of claim 1, further comprising:
    receiving a plurality of beacons from a plurality of devices over the first wireless communication network; and
    identifying an IE in at least one beacon of the plurality of beacons received from the plurality of devices, the IE in at least one indicating an availability of at least one other network that is different from the first wireless communication network.

11. The method of claim 10, further comprising:
    identifying one or more beacons from the plurality of beacons that comprise an IE that includes data indicating that one or more of the at least one other network is available;
    comparing a signal strength of each of the one or more beacons that include an IE that includes data, to identify a beacon with a greatest signal strength; and
    using the data in the IE of the beacon with the greatest signal strength to connect to one of the other networks identified by the data in the IE.

12. The method of claim 1, wherein data included in the IE comprises at least one of band, channel, and public land mobile network (PLMN) identification information for at least one PLMN.

13. The method of claim 12, further comprising:
    determining whether the beacon is received from an access point classified as a near access point based at least in part on at least one of a signal strength received from the access point, a number of mobile stations connected to the access point, and whether the access point is identified as a preferred access point.

14. The method of claim 13, further comprising:
    bypassing at least one of a High-Priority PLMN search and a better system reselection (BSR) scan when the beacon is received from the access point classified as a near access point.

15. The method of claim 1, further comprising:
    modifying at least a scanning interval, or a scanning band, or a scanning channel, or a system time, or scanning public land mobile network (PLMN) identification information, or a combination thereof based at least in part on the IE in the beacon.

16. A device for detecting a communications network, comprising:
    means for identifying, at the device, an information element (IE) in a beacon received from a device over a first wireless communication network, the IE in the beacon indicating whether a second wireless communication network is available, wherein the second wireless communication network is a different radio access technology (RAT) from the first wireless communication network;
    means for entering, by the device, a sleep mode when the IE in the beacon is empty; and
    means for bypassing scans on the second wireless communication network during the sleep mode until the device receives a subsequent beacon over the first wireless communication network, the subsequent beacon containing an IE indicating that the second wireless communication network is available.

17. The device of claim 16, further comprising:
    means for determining a signal strength of the beacon when the IE in the beacon includes data; and
    means for classifying the data in the IE in the beacon as being reliable based at least in part on the determined signal strength.

18. A method for assisting a detection of a communications network, comprising:
    accessing, by an access point, a database comprising first information indicating an availability of at least a first wireless communication network;
    broadcasting, from the access point, a beacon over a second wireless communication network, the beacon comprising an information element (IE) that indicates the availability of at least the first wireless communication network, wherein the first wireless communication network is a different radio access technology (RAT) from the second wireless communication network;
    establishing, by the access point, a connection over the second wireless communication network with at least one user equipment (UE);
    receiving, from the at least one UE, second information indicating the availability of at least the first wireless communication network; and
    populating, by the access point, the database with the second information received from the at least one UE.

19. The method of claim 18, further comprising:
periodically polling, by the access point, the at least one UE for the second information indicating the availability of at least the first wireless communication network.

20. The method of claim 18, further comprising:
periodically monitoring, by the access point, at least the first wireless communication network using a modem; and
populating, by the access point, the database with the second information indicating the availability of at least the first wireless communication network based at least in part on the periodic monitoring.

21. An apparatus for wireless communication, comprising:
a memory that stores instructions; and
a processor coupled with the memory, wherein the processor and the memory are configured to:
identify, at a user equipment (UE), an information element (IE) in a beacon received from a device over a first wireless communication network, the IE in the beacon indicating whether a second wireless communication network is available, wherein the second wireless communication network is a different radio access technology (RAT) from the first wireless communication network;
enter, by the UE, a sleep mode when the IE in the beacon is empty; and
bypass scans on the second wireless communication network during the sleep mode until the UE receives a subsequent beacon over the first wireless communication network, the subsequent beacon containing an IE indicating that the second wireless communication network is available.

22. The apparatus of claim 21, wherein the processor and the memory are further configured to:
determine a signal strength of the beacon when the IE in the beacon includes data; and
classify the data in the IE in the beacon as being reliable based at least in part on the determined signal strength.

23. The apparatus of claim 21, wherein the processor and the memory are further configured to:
transition from the sleep mode to an active mode when the IE in the subsequent beacon includes data.

24. The apparatus of claim 21, wherein the processor and the memory are further configured to:
modify at least a scanning interval, or a scanning band, or a scanning channel, or a system time, or scanning public land mobile network (PLMN) identification information, or a combination thereof based at least in part on the IE in the beacon.

25. An apparatus for wireless communication, comprising:
a memory that stores instructions; and
a processor coupled with the memory, wherein the processor and the memory are configured to:
access, by an access point, a database comprising first information indicating an availability of at least a first wireless communication network;
broadcast, from the access point, a beacon over a second wireless communication network, the beacon comprising an information element (IE) that indicates the availability of at least the first wireless communication network, wherein the first wireless communication network is a different radio access technology (RAT) from the second wireless communication network;
establish, by the access point, a connection over the second wireless communication network with at least one user equipment (UE);
receive, from the at least one UE, second information indicating the availability of at least the first wireless communication network; and
populate, by the access point, the database with the second information received from the at least one UE.

\* \* \* \* \*